(12) United States Patent
Horvath

(10) Patent No.: US 11,541,569 B2
(45) Date of Patent: Jan. 3, 2023

(54) METHOD AND DEVICE FOR PRODUCING ENGINEERED STONE SLABS

(71) Applicant: EQTEC Engineered Quartz Technology GmbH, Wiener Neustadt (AT)

(72) Inventor: Wolfgang Johann Horvath, Wiener Neustadt (AT)

(73) Assignee: EQTEC Engineered Quartz Technology GmbH, Wiener Neustadt (AT)

( * ) Notice: Subject to any disclaimer, the term of this patent is extended or adjusted under 35 U.S.C. 154(b) by 16 days.

(21) Appl. No.: 17/057,884

(22) PCT Filed: May 27, 2019

(86) PCT No.: PCT/AT2019/060176
§ 371 (c)(1),
(2) Date: Nov. 23, 2020

(87) PCT Pub. No.: WO2019/227114
PCT Pub. Date: Dec. 5, 2019

(65) Prior Publication Data
US 2021/0114253 A1 Apr. 22, 2021

(30) Foreign Application Priority Data
May 28, 2018 (AT) .............. A 50433/2018

(51) Int. Cl.
*B28B 5/02* (2006.01)
*B28B 1/00* (2006.01)
(Continued)

(52) U.S. Cl.
CPC .............. *B28B 5/025* (2013.01); *B28B 1/005* (2013.01); *B28B 13/022* (2013.01); *B28B 13/0235* (2013.01); *B30B 15/308* (2013.01)

(58) Field of Classification Search
CPC ........... B28B 5/025; B28B 5/06; B28B 1/005; B28B 3/123; B28B 13/0235; B28B 13/0225; B28B 13/023; B28B 13/022
See application file for complete search history.

(56) References Cited

U.S. PATENT DOCUMENTS 6,200,404 B1   3/2001   Andersen et al.
7,740,779 B2   6/2010   Harding et al.
(Continued)

FOREIGN PATENT DOCUMENTS

CN       1906001 A     1/2007
CN     202753274 U     2/2013
(Continued)

OTHER PUBLICATIONS

International Search Report in PCT/AT2019/060176, dated Oct. 24, 2019.

*Primary Examiner* — Alison L Hindenlang
*Assistant Examiner* — Virak Nguon
(74) *Attorney, Agent, or Firm* — Collard & Roe, P.C.

(57) ABSTRACT

The invention relates to a method and a plant for the continuous production of engineered stone slabs. In the method, raw materials comprising at least one mineral filler and one organic binder are mixed, applied to a lower belt of a dual-belt press, or a conveying means mounted upstream of the lower belt, and subsequently continuously pressed, and the binder is cured. A continuously-obtained material strand is separated into individual engineered stone slabs. It is provided that the mixing operation of the raw materials is carried out at staggered times in a batch mixing operation by means of at least two separate mixing devices. The mixed raw materials from the mixing devices are transferred into one, or multiple, spreading device(s) at staggered times and are applied continuously and without interruption to the (Continued)

Figure 2A:
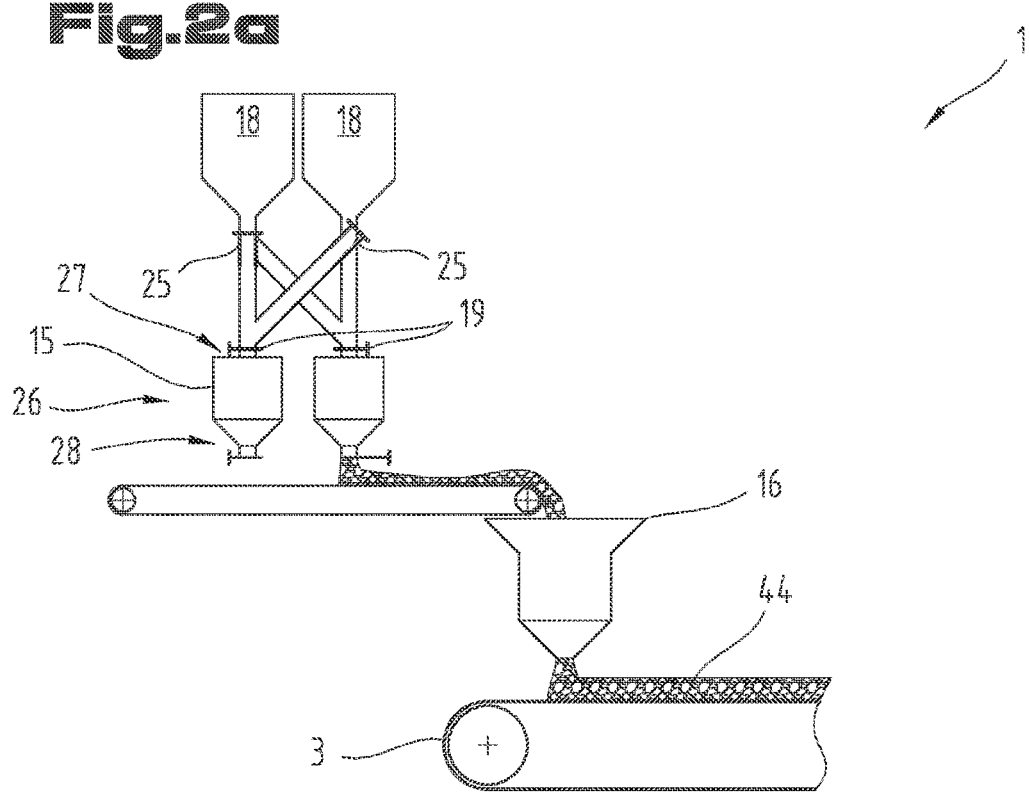

lower belt, or the conveying means mounted upstream of the lower belt, by means of the spreading device(s).

16 Claims, 9 Drawing Sheets

(51) Int. Cl.
    *B28B 13/02* (2006.01)
    *B30B 15/30* (2006.01)

(56) References Cited

U.S. PATENT DOCUMENTS

| | | | |
|---|---|---|---|
| 9,289,923 B1 * | 3/2016 | Grzeskowiak, II | B44C 5/06 |
| 10,160,137 B2 | 12/2018 | Kager | |
| 10,688,688 B2 | 6/2020 | Voith et al. | |
| 2008/0251960 A1 | 10/2008 | Harding et al. | |
| 2015/0042006 A1 * | 2/2015 | Kager | B28B 1/005 |
| | | | 425/371 |
| 2019/0030757 A1 * | 1/2019 | Voith | B29B 7/603 |
| 2019/0176112 A1 * | 6/2019 | Qiu | B01F 33/80514 |
| 2019/0217501 A1 | 7/2019 | Ricci et al. | |

FOREIGN PATENT DOCUMENTS

| | | | |
|---|---|---|---|
| CN | 103987451 A | 8/2014 | |
| CN | 104552562 A | 4/2015 | |
| CN | 107405791 A1 | 11/2017 | |
| DE | 844 810 C | 7/1952 | |
| DE | 295 07 768 U1 | 8/1995 | |
| DE | 10 2015 000 262 A1 | 7/2016 | |
| EP | 2 780 104 B1 | 9/2015 | |
| WO | 98/22269 A1 | 5/1998 | |
| WO | 2005/068146 A2 | 7/2005 | |
| WO | WO-2005068146 A2 * | 7/2005 | B28B 13/022 |
| WO | 2013/071326 A1 | 5/2013 | |
| WO | 2016/113137 A1 | 7/2016 | |
| WO | 2017/216725 A1 | 12/2017 | |

* cited by examiner

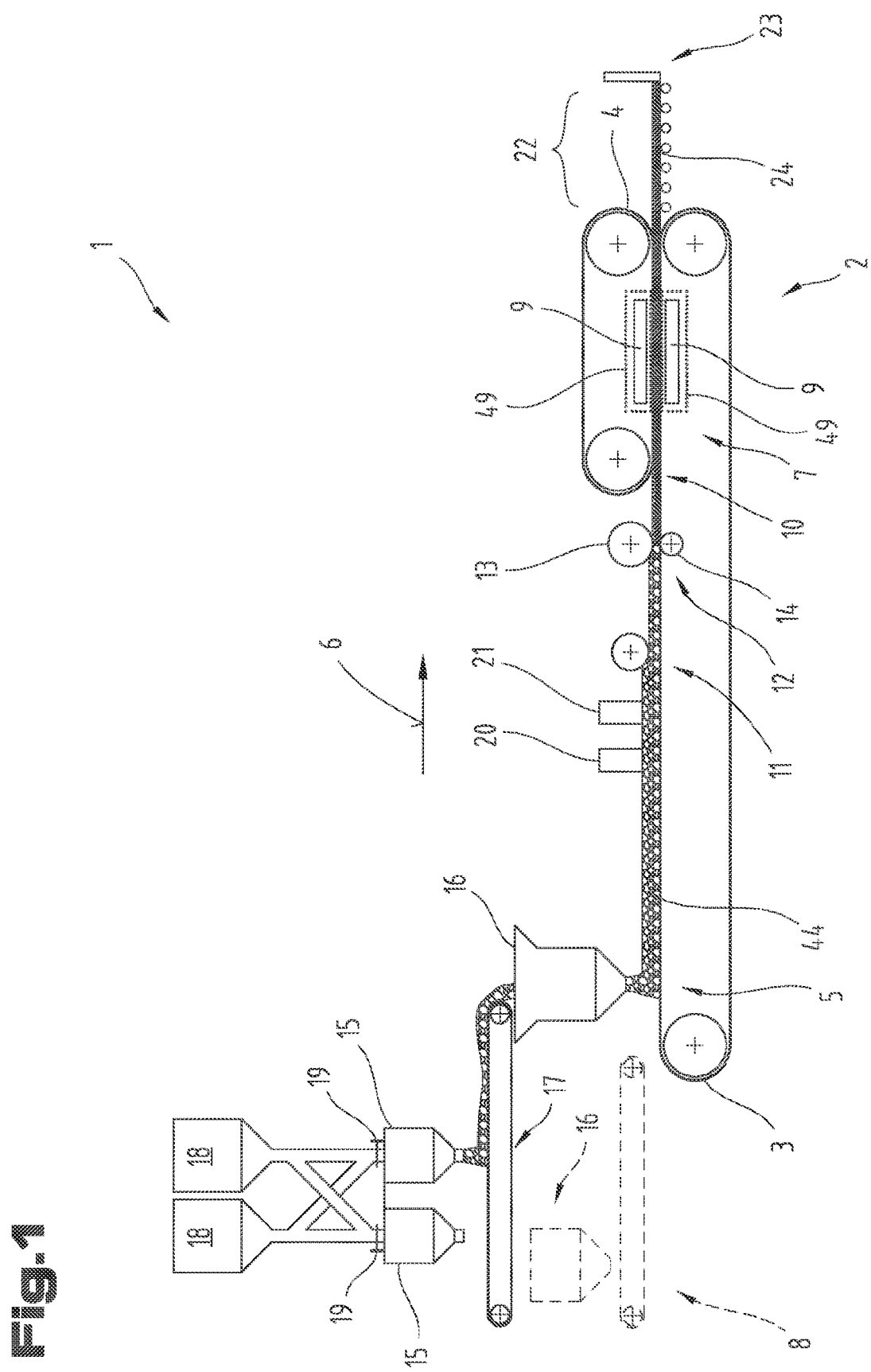

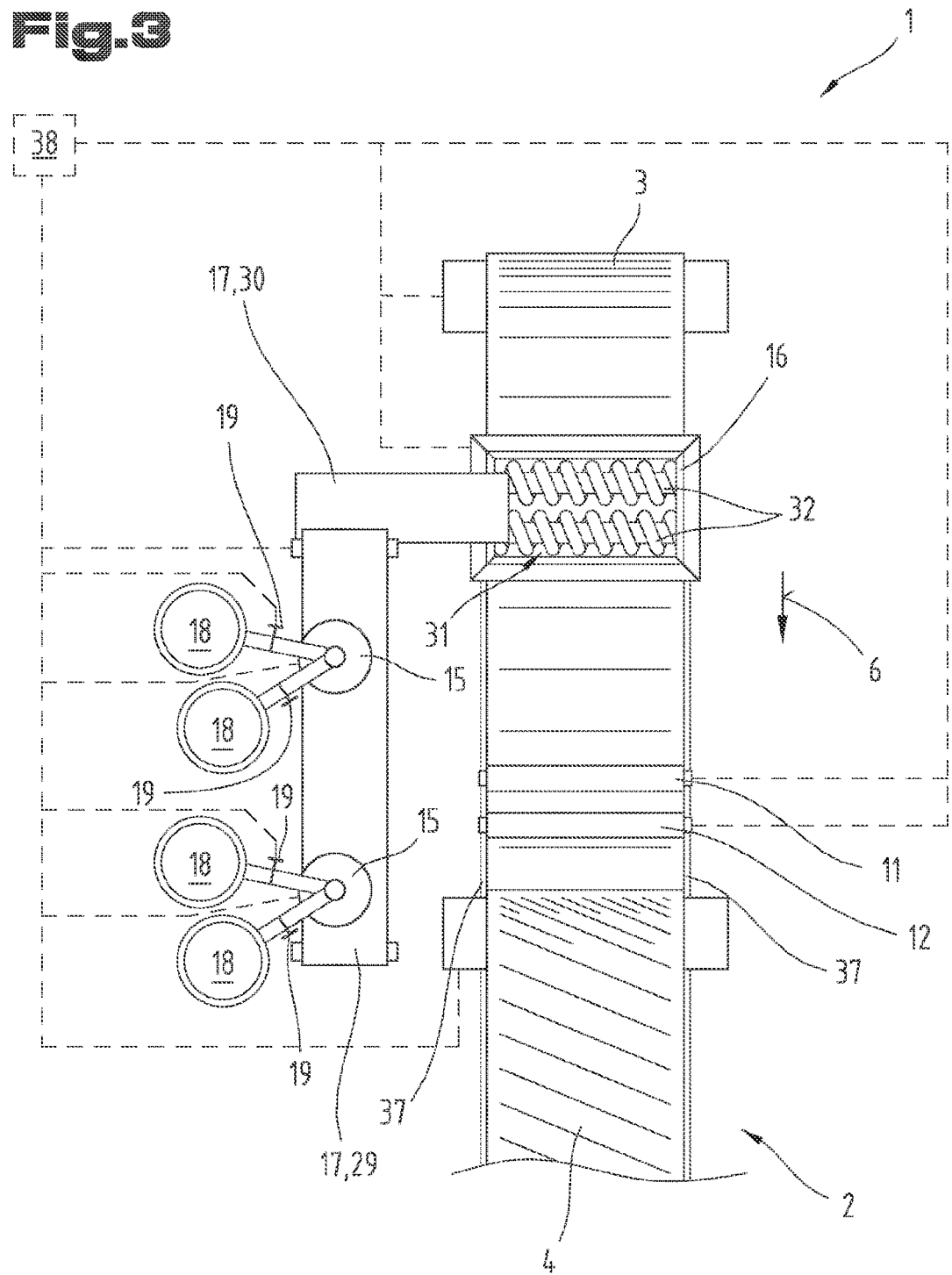

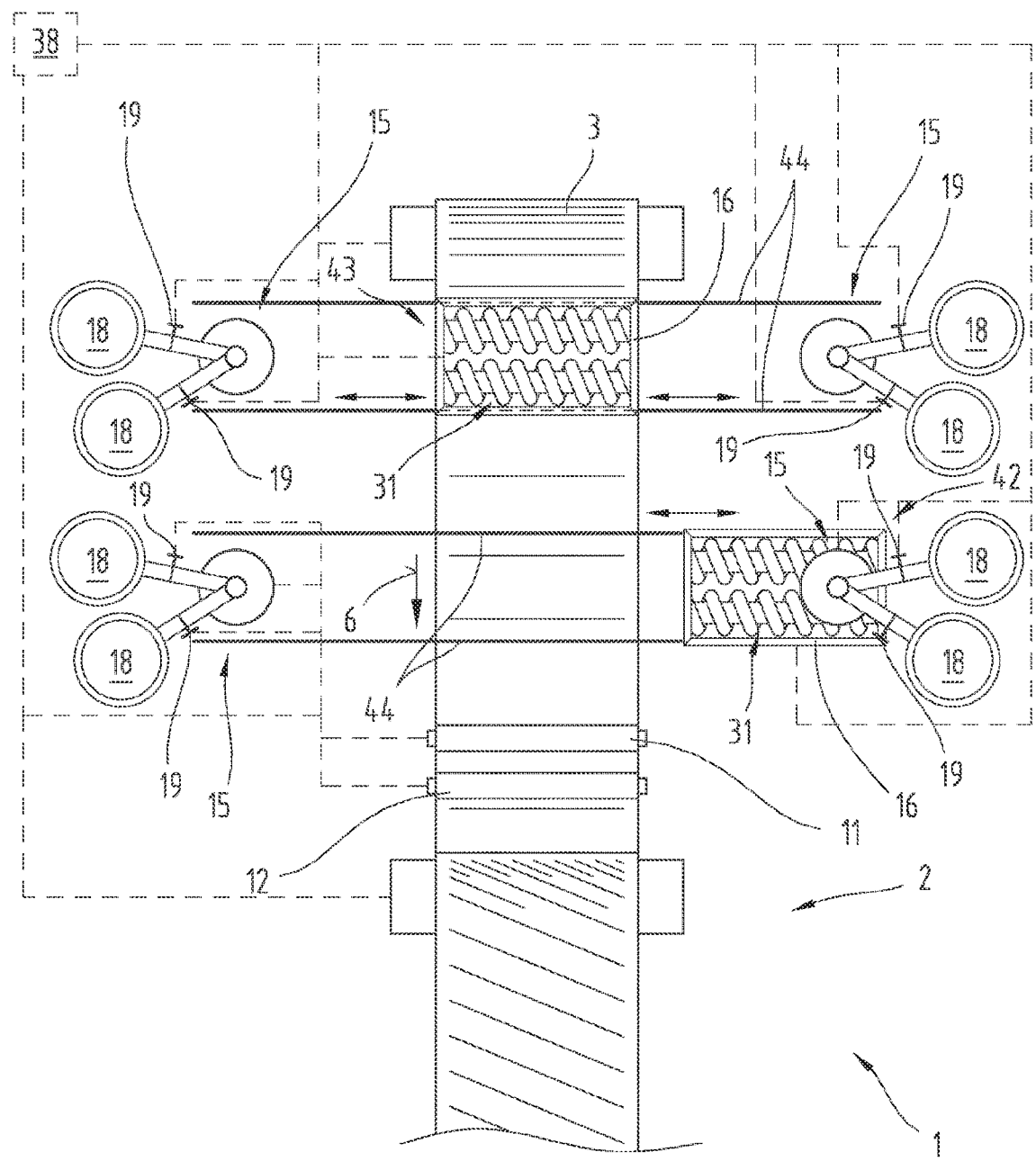

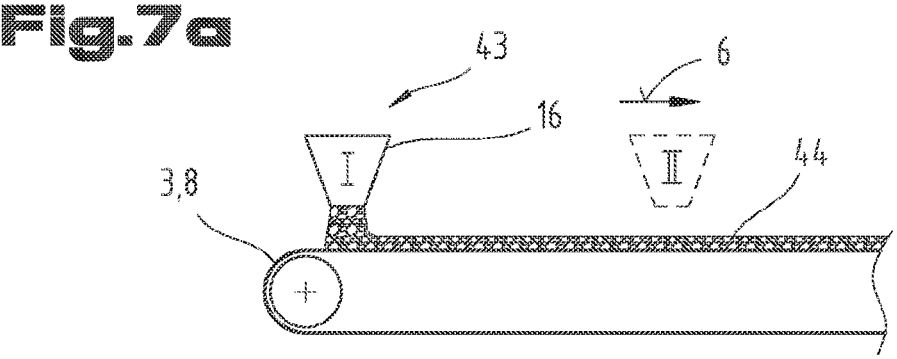
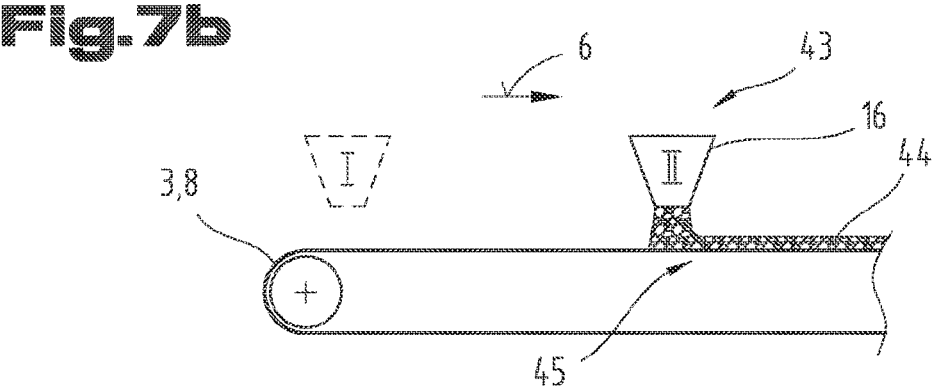
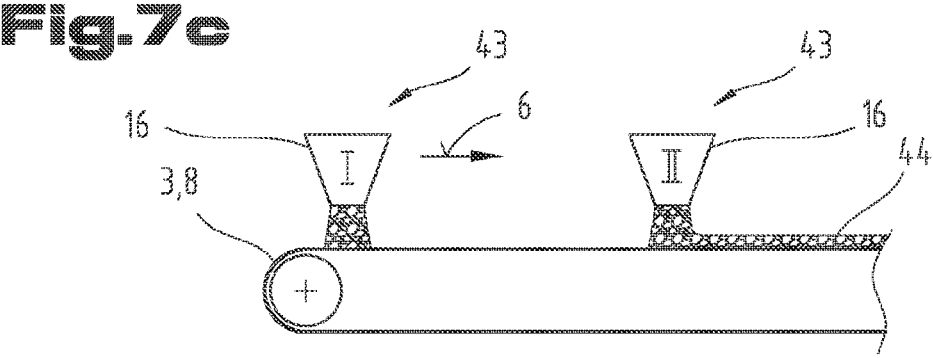
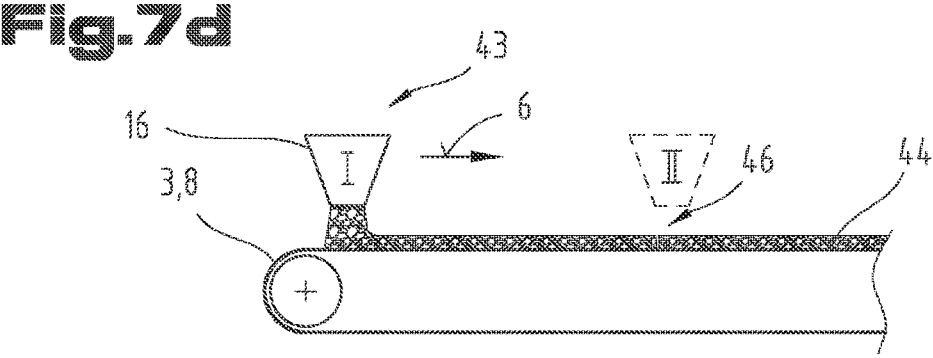

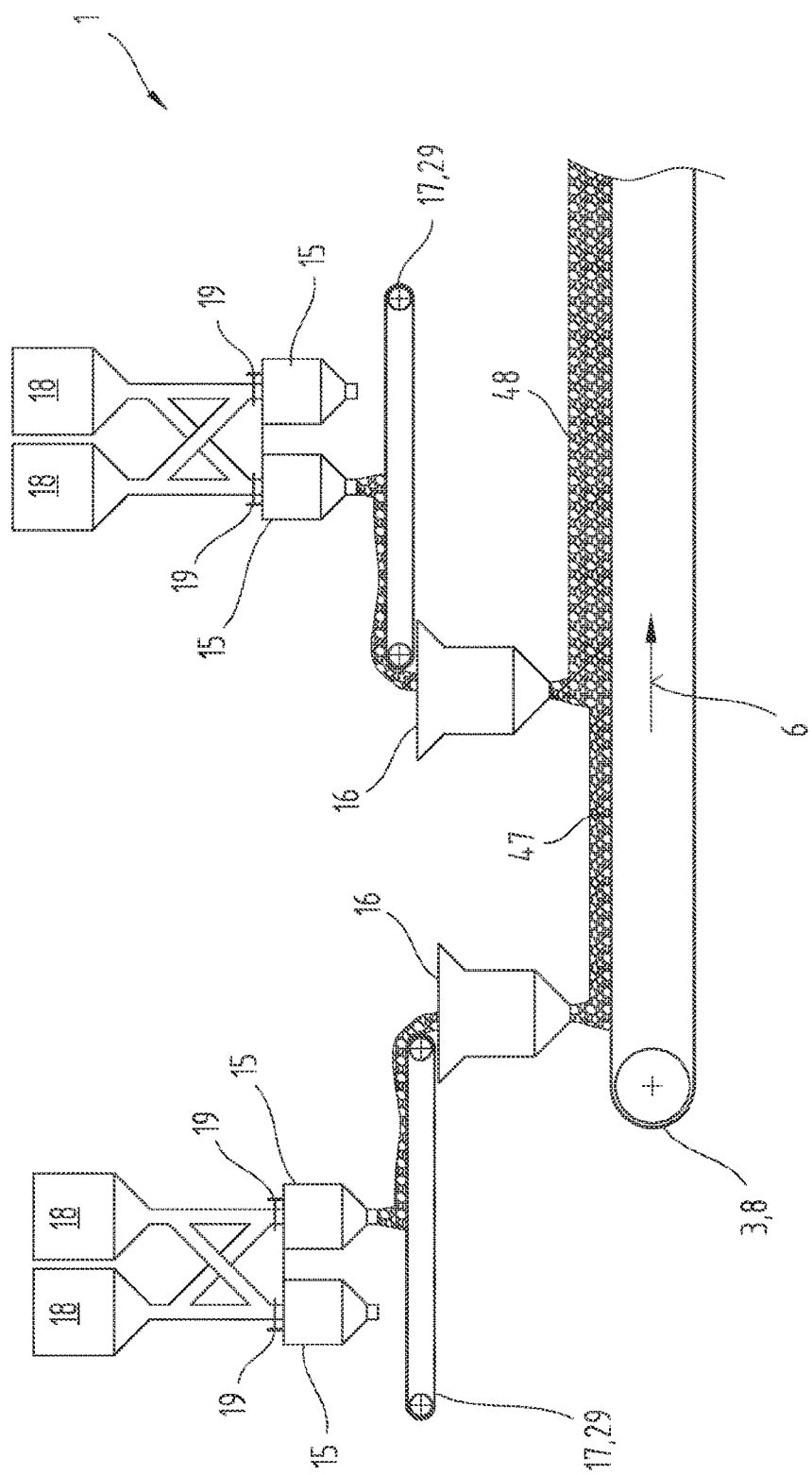

METHOD AND DEVICE FOR PRODUCING ENGINEERED STONE SLABS

CROSS REFERENCE TO RELATED APPLICATIONS

This application is the National Stage of PCT/AT2019/060176 filed on May 27, 2019, which claims priority under 35 U.S.C. § 119 of Austrian Application No. A50433/2018 filed on May 28, 2018, the disclosure of which is incorporated by reference. The international application under PCT article 21(2) was not published in English.

The invention relates to a method, as well as a device, for the continuous production of engineered stone slabs.

Engineered stone slabs are typically produced by pressing and curing a mixture of a mineral filler, for example quartz granules, and/or quartz sand, and an organic, and/or polymeric, binder, for example chemically-polymerizable and, if applicable, cross-linkable resin. Due to the possibility to adapt properties, for example the possibility to design the optical appearance, artificially-produced engineered stone slabs are increasingly gaining popularity, and such engineered stone slabs meanwhile replace stone slabs made from natural stone for numerous uses, for instance as worktops, flooring, wall linings, facade components, etc.

Conventionally, such engineered stone slabs are produced in a time-phased, i.e. discontinuous, process by mixing the raw materials, inserting the mixed materials in negative molds and subsequently pressing while the binder is cured. In principle, also methods and plants for the continuous production of engineered stone slabs have become known. In these continuous methods, for example dual-belt presses for the continuous pressing of the materials are proposed. Here, following the pressing operation, a pressed engineered-stone strand of a specific width and thickness is obtained, which is thereafter split up with regard to a desired longitudinal expansion of the engineered stone slabs.

A generic method and a device using a dual-belt press is known from EP 2 780 104 B1, in which method a continuous engineered-stone strand is produced by means of the dual-belt press. In this case, granules of rounded particles having a diameter of between 5 mm and 30 mm are manufactured in a continuous manner from the raw materials by means of a feeding device before the pressing operation. The feeding device has at least two rotatable drums, which drums are provided for producing two types of granules of rounded particles having one color each. However, the device disclosed in EP 2 780 104 B1 and the method are not suited for the industrial production of engineered stone slabs in large numbers of units. For example, in known methods, due to deviations in the properties of different raw materials and the propensity of the pressing material to agglutinate, problems may occur during production, so that reproducibility and process stability are insufficient. In particular, the mixing operations and feeding operations in the known methods and devices are problematic, insofar as they depend directly on the subsequent, continuous pressing operation, for instance on the belt velocity.

It was the object of the present invention to overcome the disadvantages of the prior art and to provide a device and a method by means of which a continuous production of engineered stone slabs in large numbers of units and with high reproducibility and process stability is enabled.

This object is achieved by a method and a device as described in the claims.

The method for the continuous production of engineered stone slabs comprises the steps provisioning raw materials comprising at least one mineral filler and at least one organic binder,
mixing the raw materials,
applying the mixed raw materials to a continuously moving lower belt of a dual-belt press, or a continuously moving conveying means mounted upstream of the lower belt,
continuously pressing the mixed raw materials to form a pressed material strand,
curing the organic binder,
and separating the material strand of engineered stone slabs into individual units.

The mixing of the raw materials is carried out in accordance with a predefinable, and/or predefined, first timing at staggered times and in a coordinated manner in a batch mixing operation by means of at least two separate mixing devices, wherein the at least two mixing devices are respectively supplied with a defined quantity of the raw materials before a respective batch mixing operation begins.

Further, the mixed raw materials are transferred from the at least two mixing devices to one, or multiple, spreading device(s) in accordance with a predefinable, and/or predefined, second timing at staggered times and in a coordinated manner, and the mixed raw materials are applied continuously and without interruption to the lower belt, or the conveying means mounted upstream of the lower belt, by means of the spreading device(s).

In particular, the mixing of the raw materials in the at least two mixing devices in accordance with the first timing may be done alternately. Equally, the transferring of the mixed raw materials from the at least two mixing devices into the spreading device(s) in accordance with the second timing may be done alternately. In this way, a continuous and uninterrupted feeding of the continuously moving lower belt, or of the continuously moving conveying means mounted upstream of the lower belt, can be ensured.

Generally, when there is mention here and below of time-staggered, and/or time staggering, this is to be understood to mean that the operations respectively described may for example be done alternately, but that it is also possible for the respective operations to overlap in time, at least partially, and/or temporarily.

The conveying means mounted upstream of the lower belt may be formed for example by a conveyor belt. At least one mixing device may be allocated to each spreading device in terms of functional technology, wherein the at least two mixing devices may for example be allocated to a single spreading device in terms of functional technology, so that the mixed raw materials are transferred from the at least two mixing devices to a single spreading device in accordance with the second timing in a time-phased manner. The mixing devices may for instance be configured as so-called rotating pan mixers.

Quartz granules, and/or quartz sand, quartzite, stone material, marble powder, etc. may for example as raw material mineral filler, or of mixtures of mineral fillers. The mineral filler(s) may be used for example in granular or pulverized form and are in particular free-flowing. Polymerizable, and/or chemically-curable resins, such as polyester, polyurethane, epoxy or phenol resins, may for example be provisioned as the raw material organic binder, wherein also multicomponent systems, which may for example contain cross-linking agents and/or curing agents or accelerators, may be used. The organic binder, and/or its components, may in principle be provisioned both in liquid and in solid, for instance granular or pulverized, form. Furthermore, additional substances, for instance pigments, coloring agents, biocides or further filling materials such as pieces of glass breakage, may be admixed as raw materials.

The specified measures ensure that a method can be provisioned which is in particular suited for the continuous mass production of engineered stone slabs. In particular, the mixing operations for producing mixed raw materials, and/or pressing material, may be carried out in a time-phased manner, and/or in timings. This ensures that the mixing parameters, such as the mixing duration, can be defined independent of the continuous spreading out of the pressing material on the lower belt, or the conveying means mounted upstream. In this way, for example a sufficient homogenization of the raw materials can be done before the application to the belt, or conveying means, independent of the continuous pressing to form a engineered-stone strand. Further, depending on the requirements for the execution of the method, and/or for the product, for example the required quantity of engineered stone slabs per unit of time, and/or the type of engineered stone to be made, a sufficient mixing capacity can respectively be provisioned.

The feeding, and/or sprinkling, of mixed raw materials onto the belt, or conveying means, is done continuously in a manner separate from the mixing operations carried out in a time-phased manner in a batch operation, so that a perpetual, continuous making of engineered stone slabs, without interruption, is enabled. The specified measures further ensure that problems occurring during the mixing, such as a formation of agglutinations of the mixed raw materials, poor intermixing, or faulty material feeding, formation of build-ups, or even clogging, can be identified in due time. In further consequence, a making of faulty engineered stone slabs can thus be prevented, and/or an undesired production of rejects impeded. Furthermore, a production of engineered stone slabs having selectable density and slab thickness may be done in a simple, yet efficient and reproducible manner Overall, the listed measures advantageously ensure that a method can be provisioned which has very high process stability and good reproducibility with regard to the products.

Preferably, it may be provided in the method that the mixed raw materials are applied across an entire belt width of the lower belt, or the conveying means mounted upstream of the lower belt, by means of one, or multiple, spreading device(s) configured and sized to that end. Further, the raw materials may be supplied to the at least two mixing devices in accordance with a predefined, and/or predefinable, third timing before a respective batch mixing operation begins. Means, and/or methods, which are known in principle may be used, for instance metering valves, flaps or screws may be utilized, to supply the respective defined quantities of raw materials to the mixing devices. The raw materials may be apportioned to the mixing devices for example from supply containers.

In a further development of the method it may be provided that the mixing devices are fed with the raw materials via an inlet opening, and the mixed raw materials are emptied from the mixing devices via an outlet opening, wherein the inlet opening and the outlet opening are closed for the respective mixing operation, so that the mixing operation is respectively carried out in a closed casing of the mixing devices.

In this way, the respective mixing of the raw materials can be carried out with particular process safety, and/or process stability.

In accordance with a preferred further development of the method, the mixed raw materials can be supplied from at least two mixing devices arranged in a fixed-installation manner to at least one spreading device arranged in a fixed-installation manner above the lower belt, or arranged in a fixed-installation manner above the conveying means mounted upstream of the lower belt, via at least one physical means for transferring mixed raw materials. The means for transfer may for example be formed by a conveyor belt, or multiple conveyor belts, a material chute or material hose.

These measures enable an execution of the method which is low-cost and particularly simple to execute, yet has process stability nevertheless. In particular, the number of required spreading devices can be minimized. Further, it is possible to make do with a relatively small number of driven machine components, which, on the one hand, is favorable with regard to the operating costs and also reduces the number potential sources of error.

Yet in one variant method, it may also be provided that the raw materials are mixed by means of at least two readjustable mixing devices, wherein a respective readjustable mixing device is readjusted respectively to an outlet position above at least one spreading device arranged in a fixed-installation manner above the lower belt, or above the conveying means mounted upstream of the lower belt, to transfer the mixed raw materials into the at least one spreading device. Furthermore, it may be provided in this execution of the method that, for filling with raw materials, the at least two mixing devices are readjusted to a filling position, or readjusted successively to multiple filling positions. A filling position may be for example a position at a material dispensing point for the raw materials, or for example a position below an outlet opening of a supply container for the raw materials.

It is of advantage here that any problems which may occur due to installed transport lines between the mixing devices and the spreading device(s) are avoided. So, for example, a possible problem during the making due to a formation of build-ups or clogging along, and/or of, such transport lines, can be avoided. Further, also in this execution of the method the number of required spreading devices can be minimized. This is possible because, despite the impossibility of two different mixing devices not being able to be positioned simultaneously above one spreading device, a respective spreading device may nevertheless serve as a material buffer for the period of time in which no materials are supplied. The mixing devices may in this variant embodiment of the method be arranged for instance carousel-like, so that each mixing device can respectively alternate between a dispensing position above a spreading device and one, or multiple, filling position(s).

Yet also of advantage may be an execution of the method in which the mixed raw materials are applied to the lower belt, or the conveying means mounted upstream of the lower belt, by means of at least two displaceable spreading devices. Here, the spreading devices can respectively be displaced to a respective loading position in accordance with a fourth timing at staggered times and in a coordinated manner to transfer the mixed raw materials from a mixing device into a spreading device, and the spreading devices be displaced to a respective spreading position above the lower belt, or the conveying means mounted upstream of the lower belt, in accordance with the fourth timing at staggered times and in a coordinated manner to apply the mixed raw materials.

Among other things, it is advantageous in this variant method that, again, transport lines between the mixing devices and the spreading device(s) can be avoided. The spreading device(s), driven in a motor-actuated, pneumatic or hydraulic manner, may for instance be arranged at adequate guide elements, such as rail guides. To avoid any material gaps on the lower belt, or the conveying means mounted upstream, it may be provided in accordance with the fourth timing that mixed raw materials are applied to the lower belt, and/or the conveying means mounted upstream, by means of a spreading device at any point in time. Here, it may in particular be provided that at least some of the time at least two spreading devices apply the mixed raw materials to the lower belt, or the conveying means mounted upstream, simultaneously at distinct points, and/or spreading positions.

In further consequence, it may also be provided that the at least two displaceable spreading devices are displaced to a respective loading position below a mixing device, and an outlet opening of the respective mixing device is subsequently opened, to transfer the mixed raw materials from a mixing device into the spreading devices.

This enables the mixed raw materials to be transferred into a respective spreading device in a manner which is particularly simple and simultaneously as faultless as possible and has as much process stability as possible.

Merely in principle, also an execution of the method is possible in which the mixed raw materials are applied to the lower belt, or to the conveying means mounted upstream of the lower belt, by means of at least two spreading devices in at least two raw-material layers arranged on top of one another.

Such an execution of the method enables an increase of the mass flow of raw materials applied to the lower belt, or the conveying means mounted upstream, so overall more material per unit of time can be applied to the lower belt, or the conveying means mounted upstream. This ensures that, overall, engineered stone slabs with great slab thickness can be produced. Of course, in such an execution of the method, sufficient mixing capacity must be provisioned. In an execution of the method having spreading devices arranged in a stationary, and/or fixed-installation, manner over the lower belt, or the conveying means mounted upstream, two spreading devices are in principle sufficient to that end. When displaceable spreading devices are used, at least three spreading devices must be used for such an execution of the method.

In a further development of the method, it may also be provided that the mixed raw materials are spread out evenly and homogeneously by means of a homogenization device arranged in the spreading device(s), and are applied to the lower belt, or the conveying means mounted upstream of the lower belt.

Here, for example a pair of rolls consisting of rolls rotating in opposite directions may be used as homogenization device, which rolls rotating in opposite directions are in particular mounted along a substantially horizontal axis of rotation. In addition, the rolls may have for example screw profiles, so that also a conveyance of the mixed raw materials in the spreading device(s) for the purpose of even spreading out is possible. This is in particular of advantage whenever the mixed raw materials are inserted in the spreading device(s) at a narrowly limited loading point. Additionally, any agglutinations of the raw materials can for example be dispersed by means of such a homogenization device, so that the mixed raw materials can be further homogenized in the spreading device(s), and in consequence be applied, and/or spread, (on)to the lower belt, or the conveying means mounted upstream, in an evenly spread-out manner. Alternatively or additionally, such homogenization and/or crusher devices may also be installed upstream of a spreading device.

Finally, in another embodiment of the method, it may be provided that the raw materials applied to the lower belt are compacted between upper belt and lower belt of the dual-belt press by means of one, or multiple, precompaction roll(s), or pair(s) of precompaction rolls, before the entry.

Here, it is in particular advantageous that the dual-belt press itself is protected from excessive abrasion, especially in the material entry zone, as it is an already precompacted material that enters the dual-belt press. In further consequence, the life span of the dual-belt press can be extended in this way, and/or costly repair operations of the dual-belt press can be delayed as long as possible. In contrast to this, the precompaction roll(s), and/or pair(s) of precompaction rolls, when overabraded, can be replaced without great effort and at relatively low costs. Here, the extent of the precompaction by means of the precompaction roll(s) may well amount for example to 90% or more in relation to the final compaction after the passage through the dual-belt press.

An execution of the method may finally be done in such a way that at least a metering operation of the raw materials into the mixing devices and a mixing duration in the mixing devices, as well as an application velocity of the mixed raw materials to the lower belt, or the conveying means mounted upstream of the lower belt, a belt velocity of the lower belt and compacting pressure on the mixed raw materials with regard to the respectively desired density and thickness of the engineered stone slabs is controlled.

The object of the invention is also achieved by provisioning a plant.

The plant for the continuous production of engineered stone slabs comprises
  one, or multiple, supply container(s) for containing raw materials,
  as well as a dual-belt press having a lower belt and an upper belt, as well as at least one heating means for heating materials conveyed between the lower belt and the upper belt.

At least two separately arranged mixing devices configured for a batch mixing operation are arranged to mix the raw materials. Furthermore, one, or multiple, spreading device(s) configured for the continuous feeding of the lower belt, or a conveying means mounted upstream of the lower belt, with mixed raw materials is, or are, arranged. Further, at least one means for transferring mixed raw materials from the at least two mixing devices into the spreading device(s) is provided.

The conveying means mounted upstream of the lower belt may be formed for example by a conveyor belt. At least one mixing device may be allocated to each spreading device in terms of functional technology, wherein the at least two mixing devices may for example be allocated to a single spreading device in terms of functional technology, so that, during operation of the plant, the mixed raw materials can be transferred from the at least two mixing devices to a single spreading device in a time-phased, and/or time-staggered, manner. The at least one means for transferring mixed raw materials from the at least two mixing devices into the spreading device(s) may for instance be a physical conveying means, such as a material conveyor belt. Yet the means for transfer may also be gravity, in terms of the mixed raw materials being emptied from the at least two mixing devices into the spreading device(s) during operation of the plant.

The specified features ensure that a plant can be provisioned which is particularly well-suited for the continuous mass production of engineered stone slabs. In particular, during operation of the plant the mixing operations for producing mixed raw materials, and/or pressing material, may be carried out in a time-phased manner, and/or in timings. This ensures that mixing parameters, such as the mixing duration, can be defined independent of the continuous spreading out of the pressing material on the lower belt, or the conveying means mounted upstream. The mixing devices may for instance be formed by so-called rotating pan mixers.

The possibility of connecting batch mixing operations and continuous belt feeding during operation of the plant further ensures that problems occurring during the mixing, such as a formation of agglutinations of the mixed raw materials, poor intermixing, or faulty material feeding, formation of build-ups, or even clogging, can be identified in due time. In further consequence, a making of faulty engineered stone slabs can thus be prevented, and/or an undesired production of rejects impeded. Overall, the specified features advantageously ensure that an operation of the plant can be done with very high process stability and good reproducibility with regard to the products.

Preferably, it may be provided that the spreading device(s), in particular a lower dispensing opening of the spreading device(s), is, or are, designed and sized in such a way that the mixed raw materials can be applied across an entire belt width of the lower belt, or the conveying means mounted upstream of the lower belt. To that end, a width extension of a lower outlet opening of the spreading device(s) may correspond, at least largely, to a belt width of the lower belt.

Means which are known in principle may be provided to supply the respective defined quantities of raw materials to the mixing devices, for instance metering valves, flaps or screws may be arranged. One, or multiple, supply container(s) may for example be arranged to store, and/or interim-store, the raw materials.

In one variant design of the plant, a control device may be provided, which control device is configured for carrying out, at staggered times and in a coordinated manner, mixing operations in the mixing devices in accordance with a first timing, as well as for carrying out, at staggered times and in a coordinated manner, transfer operations of the mixed raw materials from the mixing devices into the spreading device(s) in accordance with a second timing.

A control device configured in such a way ensures that for example a sufficient homogenization of the raw materials can be done during operation of the plant before the application to the belt, or conveying means, independent of the continuous pressing to form a engineered-stone strand. The feeding, and/or sprinkling, of the belt, or conveying means, with mixed raw materials can be done continuously in a manner separate from the mixing operations carried out in a time-phased manner in a batch operation, so that a perpetual, continuous making of engineered stone slabs, without interruption, is enabled.

In particular, the control device may be configured for carrying out the mixing operations in the at least two mixing devices in accordance with the first timing in alternating sequence. Equally, the control device may be configured for carrying out the transfer operations of the mixed raw materials from the at least two mixing devices into the spreading device(s) in accordance with the second timing in alternating sequence. In this way, a continuous and uninterrupted feeding of the continuously moving lower belt, or of the continuously moving conveying means mounted upstream of the lower belt, can be ensured during operation of the plant. Further, the control device may be configured for supplying the raw materials to the at least two mixing devices before a respective batch mixing operation begins in accordance with a predefined, and/or predefinable, third timing, in particular in alternating sequence.

In another design of the plant, it may be provided that the mixing devices respectively have a casing with a closable inlet opening and a closable outlet opening.

This ensures that, during operation of the plant, the mixing operations can be carried out with particular process safety, and/or process stability.

In a preferred variant design of the plant, at least two mixing devices arranged in a fixed-installation manner, as well as at least one spreading device arranged in a fixed-installation manner above the lower belt, or arranged in a fixed-installation manner above the conveying means mounted upstream of the lower belt, may be provided, wherein at least one physical means for transferring mixed raw materials, in particular a conveyor belt, a material chute or material hose, may be arranged to transfer mixed raw materials from the mixing devices into the at least one spreading device arranged in a fixed-installation manner.

This enables an operation of the plant that can be executed in a particularly simple and low-cost manner, yet with good process stability nevertheless. In particular, the number of required spreading devices can be minimized. Further, it is possible to make do with a relatively small number of driven machine components, which, on the one hand, is favorable with regard to the operating costs and also reduces the number of potential sources of error.

Yet also a design of the plant may be provided in which at least two readjustable mixing devices and at least one spreading device arranged in a fixed-installation manner above the lower belt, or above the conveying means mounted upstream of the lower belt, are provided, wherein a respective mixing device is arranged so as to be readjustable to an outlet position above the at least one spreading device. Here, the at least two readjustable mixing devices may be arranged so as to be readjustable to a filling position, or successively to multiple filling positions. A filling position may be for example a position at a material dispensing point for the raw materials, or for example a position below an outlet opening of a supply container for the raw materials.

During operation of the plant, these features result in the advantage that any problems which may occur due to installed transport lines between the mixing devices and the spreading device(s) can be avoided. Further, in this variant design of the plant, the number of required spreading devices can be minimized. This is possible because, despite the impossibility of two different mixing devices not being able to be positioned simultaneously above one spreading device, a respective spreading device may nevertheless serve as a material buffer for the period of time in which no materials are supplied. The mixing devices may, in this variant design of the plant, be arranged for instance carousel-like, so that each mixing device is respectively arranged so as to be readjustable between a dispensing position above a spreading device and one, or multiple, filling position(s).

Yet also a design of the plant may be useful in which at least two displaceable spreading devices are arranged, which displaceable spreading devices are displaceable from a respective mixing device to a respective loading position to transfer mixed raw materials, and which displaceable spreading devices are displaceable to a respective spreading position above the lower belt, or the conveying means mounted upstream of the lower belt, to apply the mixed raw materials.

Also in this embodiment, transport lines between the mixing devices and the spreading device(s) can be avoided, and thus possibly-occurring build-ups, and/or clogging, can be prevented more effectively. The spreading device(s), driven in a motor-actuated, pneumatic or hydraulic manner, may for instance be arranged at adequate guide elements, such as rail guides.

Yet in this variant design of the plant, it may also be provided that the displaceable spreading devices are arranged so as to be displaceable to a respective loading position below a mixing device.

During operation of the plant, this ensures that the mixed raw materials can be transferred into a respective spreading device in a manner which is particularly simple and simultaneously as faultless as possible and has as much process stability as possible.

Furthermore, in the variant design having displaceably-arranged spreading devices, also a control device may be provided, which control device is configured for loading the spreading devices with mixed raw materials and for applying the mixed raw materials to the lower belt, or to the conveying means mounted upstream of the lower belt, to carry out the displacement movements of the displaceable spreading devices in accordance with a fourth timing at staggered times and in a coordinated manner.

The provision of a control device configured in such a way ensures that material gaps on the lower belt, or the conveying means mounted upstream, can be avoided during operation of the plant. In particular, it may be provided in accordance with the fourth timing that mixed raw materials are applied to the lower belt, and/or the conveying means mounted upstream, by means of a spreading device at any point in time. To control the displaceable spreading devices, the control device may in particular be configured in such a way that, during operation of the plant, at least some of the time at least two spreading devices apply the mixed raw materials to the lower belt, or the conveying means mounted upstream, simultaneously at distinct points, and/or spreading positions.

In a preferred design, it may be provided that, for an even and homogeneous spreading out of the mixed raw materials on the lower belt, or the conveying means mounted upstream of the lower belt, the spreading device(s) have a homogenization device, in particular in the form of rolls mounted along a substantially horizontal axis of rotation and rotatable in opposite directions.

In addition, the rolls may have for example screw profiles, so that also a conveyance of the mixed raw materials in the spreading device(s) for the purpose of even spreading out is possible. This is in particular of advantage whenever the mixed raw materials are inserted in the spreading device(s) at a narrowly limited loading point. During operation of the plant, for example also any agglutinations of the raw materials can be dispersed by means of such a homogenization device, so that the mixed raw materials can be further homogenized in the spreading device(s) and in consequence be applied, and/or spread, (on)to the lower belt, or the conveying means mounted upstream, in an evenly spread-out manner. Alternatively or additionally, such homogenization and/or crusher devices may also be arranged so as to be installed upstream of a spreading device.

In another design, one, or multiple, precompaction roll(s), or pair(s) of precompaction rolls, may be arranged in a transport direction for the raw materials at the lower belt before an entry point between upper belt and lower belt of the dual-belt press.

During operation of the plant, the dual-belt press itself can be protected from excessive abrasion, especially in the material entry zone, as an already precompacted material may enter the dual-belt press. In further consequence, the life span of the dual-belt press can be extended in this way and/or costly repair operations of the dual-belt press can be delayed as long as possible. In contrast, the precompaction roll(s), and/or pair(s) of precompaction rolls, when over-abraded, can be replaced without great effort and at relatively low costs.

Finally, it may be provided in one design of the plant that the control device is configured at least for controlling, in a time-coordinated manner, a metering operation of the raw materials into the mixing devices, mixing duration in the mixing devices, as well as for controlling an application velocity of the mixed raw materials to the lower belt, or the conveying means mounted upstream of the lower belt, belt velocity of the lower belt and compacting pressure on the mixed raw materials with regard to respectively desired density and thickness of the engineered stone slabs.

For the purpose of a better understanding of the invention, the latter will be elucidated in more detail by means of the figures below.

Figure 2B:
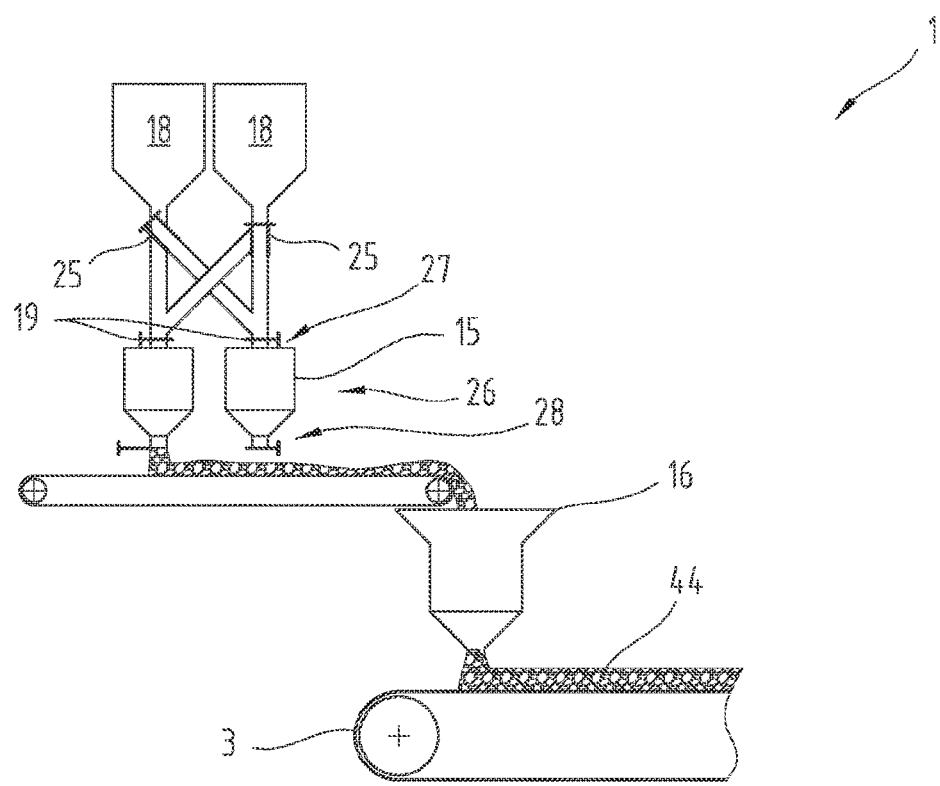
Figure 4:
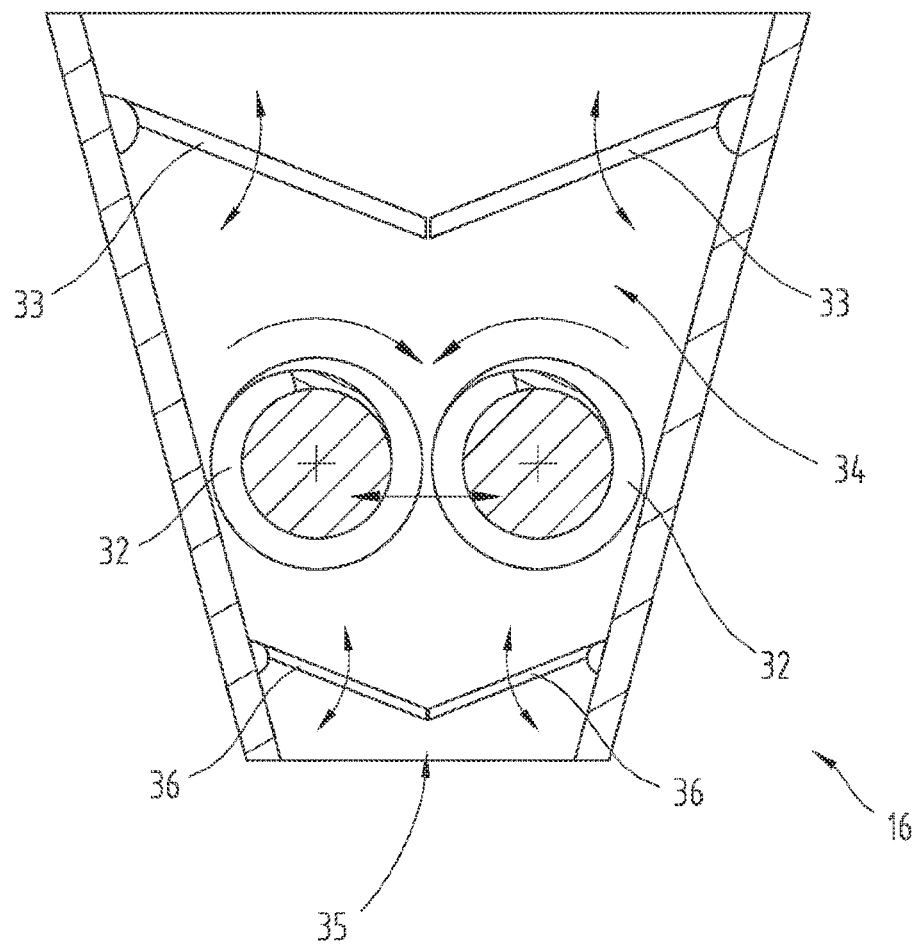
Figure 5:
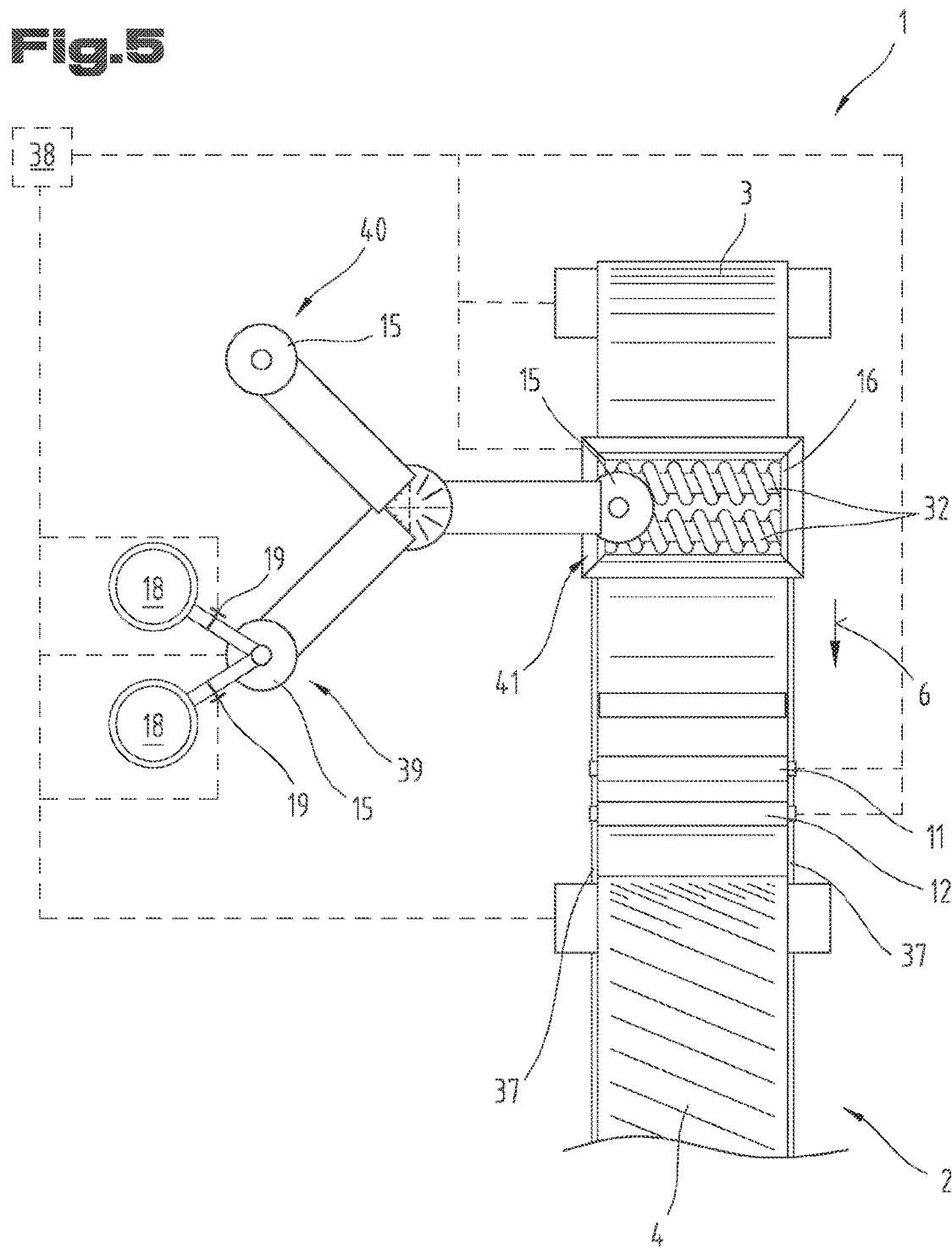

In a strongly simplified, schematic depiction, each figure shows as follows:

FIG. 1 a lateral view of an exemplary embodiment for a plant for the continuous production of engineered stone slabs;

FIGS. 2a, 2b time-staggered snapshots during operation of a plant for the continuous production of engineered stone slabs;

FIG. 3 a plan view from the top of an exemplary embodiment for a plant for the continuous production of engineered stone slabs;

FIG. 4 a sectional view of an exemplary embodiment for a spreading device;

FIG. 5 a plan view from the top of another exemplary embodiment for a plant for the continuous production of engineered stone slabs;

FIG. 6 a plan view from the top of another exemplary embodiment for a plant for the continuous production of engineered stone slabs;

FIGS. 7a-7d time-staggered snapshots during operation of a plant for the continuous production of engineered stone slabs;

FIGS. 8a-8e time-staggered snapshots during operation of a plant for the continuous production of engineered stone slabs;

FIG. 9 a lateral view of another exemplary embodiment for a plant for the continuous production of engineered stone slabs;

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, and these specifications of location are to be analogously transferred to the new position.

In FIG. 1, plant 1 for the continuous production of engineered stone slabs is depicted. In accordance with the depicted exemplary embodiment, the plant 1 comprises a dual-belt press 2 having a lower belt 3 and an upper belt 4. As is further apparent from FIG. 1, the lower belt 3 has a greater length than the upper belt 4 and is arranged staggered relative to the upper belt 4, so that materials, and/or raw materials, to be pressed can be applied to the lower belt 3 in a material application zone 5 and subsequently be transported between the lower belt 3 and the upper belt 4 in a transport direction 6 into a processing zone 7. As an alternative to an application to the lower belt 3 of the materials to be pressed, the raw materials may also be applied to a conveying means 8 mounted upstream of the lower belt 3 in a transport direction 6, as this is illustrated by means of dashed lines on the left hand side in FIG. 1. Such a conveying means mounted upstream of the lower belt 3 may be formed for example by a separate conveyor belt. A length of the lower belt 3 may in such cases be selected to be shorter. During operation of the plant 1, the lower belt 3 and, if applicable, the conveying means 8 mounted upstream, are moving continuously, so that applied raw materials are conveyed, and/or transported, in a transport direction 6.

Furthermore, the dual-belt press comprises at least one heating means 9 for heating materials conveyed between the lower belt 3 and the upper belt 4, wherein two heating means 9 for heating the materials, and/or raw materials, to be pressed from the top and from the bottom are arranged in the exemplary embodiment in accordance with FIG. 1. The heating means 9 may be formed for example by resistance heating elements, or by heating elements perfused with a heating fluid.

As is further apparent from FIG. 1, one, or multiple, precompaction roll(s) 11, or pair(s) of precompaction rolls 12, may be arranged at the lower belt 3 in a transport direction 6 for the raw materials before an entry point 10 between upper belt 4 and lower belt 3 of the dual-belt press 2. As depicted, a pair of precompaction rolls 12 may consist of a compaction roll 13 and a, proportionally smaller, back-pressure roll 14, wherein the compaction roll 13 may be configured abrasion-resistant, for instance be chrome-plated or rubberized or have an abrasion-resistant engineered-stone layer. During operation of the plant 1, the raw materials applied to the lower belt 3 can be compacted before the entry between upper belt 4 and lower belt 3 of the dual-belt press 2 by means of such, or multiple, precompaction roll(s) 11, or pair(s) of precompaction rolls 12, so that the dual-belt press 2 itself can be protected from excessive abrasive wear, in particular at the entry point 10. Here, an extent of the precompaction may well be selected very high, and may for example amount to 70% or above, in particular 90% or above, in relation to the final compaction of the raw materials after the passage through the dual-belt press.

Before the entry into the dual-belt press 2, and/or before the precompaction, the raw materials are mixed and applied to the lower belt 3, or the conveying means 8 mounted upstream. As depicted in FIG. 1, at least two mixing devices 15 are arranged to mix the raw materials, which mixing devices 15 are separately arranged and designed for a batch mixing operation. The mixing devices 15 may for instance be formed by so-called rotating pan mixers. Furthermore, one, or multiple, spreading device(s) 16 configured for the continuous feeding of the lower belt 3, or of a conveying means 8 mounted upstream of the lower belt 3, with mixed raw materials is, or are, arranged, wherein merely one spreading device 16 is depicted in the exemplary embodiment in accordance with FIG. 1. As equally illustrated, the respectively mixed raw materials are applied, and/or spread, (on)to the lower belt 3 of the dual-belt press 2, or the conveying means 8 mounted upstream of the lower belt 3, by means of the spreading device(s) 16. The raw-material layer 44 thus created is perpetually conveyed in a transport direction 6 during operation of the plant 1 by means of the continuously moving lower belt 3 and, if applicable, the conveying means 8.

Further, at least one means 17 for transferring mixed raw materials from the at least two mixing devices 15 into the spreading device(s) 16 is provided. In the exemplary embodiment in accordance with FIG. 1, a joint means 17 for transferring the mixed raw materials from both mixing devices 15 into the depicted spreading device 16 is schematically depicted, wherein the means 17 is in this case formed by a conveyor belt. As will be described below, also other physical means 17 for transferring mixed raw materials, such as material chutes or material hoses, may be provided. Further, it is possible that the means for transferring mixed raw materials is formed by gravity, and/or gravitational force, in terms of readjustable mixing devices 15 being positioned above a spreading device 16, or displaceable spreading devices 16 being positioned below mixing devices 15.

At least one mixing device 15 may be allocated to each spreading device 16 in terms of functional technology, wherein the two mixing devices 15 provided are allocated to a single spreading device 16 in terms of functional technology in accordance with the exemplary embodiment depicted in FIG. 1. It is self-evident that a plant 1 may also comprise more than two mixing devices 15 and more than one spreading device 16, wherein, again, at least one mixing device 15 may be allocated to each spreading device 16 in terms of functional technology. By enlarging the number of mixing devices 15, and/or spreading devices 16, in particular a larger quantity of mixed raw materials per unit of time can be applied to the lower belt 3, or the conveying means 8 mounted upstream, whereby for example engineered stone slabs with greater slab thickness can be produced.

As is depicted in the exemplary embodiment in accordance with FIG. 1, the plant 1 comprises one, or multiple, supply container(s) 18 for containing, and/or interim-storing, raw materials, wherein one supply container 18 may be designed for joint storage of multiple raw materials, or multiple supply containers 18 may be provided for separate storage of one raw material each. Further, metering devices 19, for instance readjustable valves or flaps, may be arranged to apportion the raw materials from the supply container(s) 18 into the mixing devices 15. In the exemplary embodiment depicted in FIG. 1, two supply containers 18 are provided, from which the raw materials of a respective mixing device 15 can be supplied.

Furthermore, for example a plow 20 for spreading out the raw materials on the lower belt 3, as well as a doctor blade 21 for smoothing the raw materials on the lower belt 3, may be arranged. As is depicted in FIG. 1, the plant 1 may furthermore comprise a cooling zone 22, as well as a separation device—as known in principle—, for instance a cutting device 23, following the dual-belt press 2 in a transport direction 6. Here, a cutting device 23 may comprise one, or multiple, sawing devices. For example, at least one such sawing device for splitting up a material strand 24 of pressed and cured raw materials transverse to the transport direction 6 may be provided to obtain engineered stone slabs with a respectively desired slab length. Yet, additionally, also sawing devices may be provided which are provided either for trimming or for splitting up a material strand 24 obtained after the passage through the dual-belt press 2 in a transport direction 6. This ensures that for example engineered stone slabs with a respectively desired slab width are obtained.

As is equally schematically apparent from FIG. 1, the method for the continuous production of engineered stone slabs comprises the steps provisioning raw materials comprising at least one mineral filler and at least one organic binder, mixing the raw materials, applying the mixed raw materials to a continuously moving lower belt 3 of a dual-belt press 2, or a continuously moving conveying means 8 mounted upstream of the lower belt 3 in a transport direction 6, continuously pressing the mixed raw materials to form a pressed material strand 24, curing the organic binder, and separating the material strand 24 to form individual engineered stone slabs.

Quartz granules, and/or quartz sand, quartzite, stone material, marble powder, etc. may for example as the raw material mineral filler, or of mixtures of mineral fillers. The mineral filler(s) may be used for example in granular or pulverized form and are in particular free-flowing. Polymerizable, and/or chemically-curable resins, such as polyester, polyurethane, epoxy or phenol resins, may for example be provisioned as the raw material organic binder, wherein also multicomponent systems, which may for example contain cross-linking agents and/or curing agents or accelerators, may be used. The organic binder, and/or its components, may in principle be provisioned both in liquid and in solid, for instance granular or pulverized, form. Furthermore, additional substances, for instance pigments, coloring agents, biocides or further filling materials such as pieces of glass breakage, may be admixed as raw materials.

The mixing of the raw materials is carried out in accordance with a predefined, and/or predefinable, first timing at staggered times in a batch mixing operation by means of at least two separate mixing devices 15, wherein the at least two mixing devices 15 are supplied with a defined quantity of the raw materials before a respective batch mixing operation begins. The mixed raw materials from the at least two mixing devices 15 are transferred into one, or multiple, spreading device(s) in accordance with a second timing 16 at staggered times. By means of the spreading device(s) 16, the mixed raw materials are applied continuously and without interruption to the lower belt 3, or the conveying means 8 mounted upstream of the lower belt 3.

In FIGS. 2a and 2b, an exemplary embodiment for the time-phased mixing operation on the basis of 2 time-staggered snapshots of the operation of the plant is depicted in accordance with the exemplary embodiment shown in FIG. 1.

As is apparent on the basis of the snapshot depicted in FIG. 2a, mixed raw materials are in the process of being transferred, in accordance with the second timing, from the mixing device 15 depicted on the right hand side into the depicted spreading device 16 via the means 17 for transferring the mixed raw materials, and applied to the lower belt 3 by means of the spreading device 16, while a raw-material layer 44 forms. Meanwhile, the raw materials in the mixing device 15 depicted on the left hand side are in the process of being mixed in accordance with the first timing. Alternatively, in accordance with the snapshot in FIG. 2a, it could be provided that raw materials are in the process of being filled, in accordance with a third timing, from the supply containers 18 into the mixing device 15 depicted on the left hand side and the mixing operation in accordance with the second timing is only started subsequently. In the exemplary embodiment depicted in FIG. 2a, for instance switchover flaps 25 may be used to switch the filling lines from the supply containers 18 to respectively one of the two mixing devices 15.

In FIG. 2b, a snapshot which is staggered in time relative to the snapshot in accordance with FIG. 2a is depicted during operation of holding zone 1. As is apparent, this snapshot shows mixed raw materials in the process of being transferred, in accordance with the second timing, from the mixing device 15 depicted on the left hand side into the depicted spreading device 16 via the means 17 for transferring mixed raw materials, and applied to the lower belt 3 by means of the spreading device 16. Meanwhile, the raw materials in the mixing device 15 depicted on the right hand side are in the process of being mixed in accordance with the first timing. Alternatively, in accordance with the snapshot in FIG. 2b, it could, again, be provided that raw materials are in the process of being filled, in accordance with the third timing, from the supply containers 18 into the mixing device 15 depicted on the right hand side, and the mixing operation in accordance with the second timing is only started subsequently.

As can be seen when regarding FIGS. 2a and 2b in combination, in the exemplary embodiment depicted herein raw materials can be mixed, in accordance with the first timing, in the mixing devices 15 in a respectively alternating manner, and mixed raw materials likewise be transferred, in accordance with the second timing, into the spreading device 16 in a respectively alternating manner. It is self-evident that the first, second and third timings may be defined in such a way that individual mixing operations in distinct mixing devices 15 in accordance with the first timing, as well as individual transfer operations from distinct mixing devices 15 into one, or multiple, spreading device(s) 16, may overlap in time even at least partially, i.e. be executed simultaneously at least some of the time. This is true in particular whenever more than one spreading device 16 and more than two mixing devices 15 are used. The same is true, of course, for supplying the raw materials to the mixing devices 15 in accordance with the third timing. The respective starting points and periods of time of the individual supply, mixing and transfer operations in accordance with the timings can preferably be respectively defined, and/or prescribed, in such a way, so that material gaps do not occur on the lower belt 3.

As further depicted in FIGS. 2a and 2b, the mixing devices 15 may respectively have a casing 26 with a closable inlet opening 27 and a closable outlet opening 28. During operation of the plant, it may thereafter be provided that the mixing devices 15 are fed with the raw materials via an inlet opening 27, and the mixed raw materials are emptied from the mixing devices 15 via an outlet opening 28, wherein the inlet opening 27 and the outlet opening 28 are closed for the mixing operation. In this way, the mixing operations can respectively be carried out in a closed casing 26 of the mixing devices 15.

Various further aspects of a plant 1, and/or of a method for the continuous production of engineered stone slabs, will be elucidated in more detail below on the basis of further exemplary embodiments.

In FIG. 3, a plan view from the top of an exemplary embodiment for a plant 1 for the continuous production of engineered stone slabs is depicted. In FIG. 3, equal parts are provided with equal reference numbers and/or equal component designations as in the preceding FIGS. 1-2. In order to avoid unnecessary repetition, mention and/or reference is made of and/or to the detailed description in the preceding FIGS. 1-2.

As is apparent in FIG. 3, at least two mixing devices 15 arranged in a fixed-installation manner, as well as at least one spreading device 16 arranged in a fixed-installation manner above the lower belt 3, may be provided in a plant 1. Alternatively, also at least one spreading device 16 arranged in a fixed-installation manner above a conveying means 8 mounted upstream of the lower belt 3 may be provided, as this is depicted in FIG. 1 using dashed lines. To transfer mixed raw materials from the mixing devices 15 into the at least one spreading device 16 arranged in a fixed-installation manner, at least one physical means 17 for transferring mixed raw materials, in particular a conveyor belt 29, a material chute 30 or material hose, may be arranged.

In the depicted exemplary embodiment, two mixing devices 15 are arranged in a fixed-installation manner at the side(s) of the lower belt 3 of the dual-belt press 2. As depicted, 2 supply containers 18 for supplying the raw materials may respectively be allocated to the mixing devices 15, wherein for example one supply container 18 each may be provided for storing, and/or interim-storing, (a) mineral filler(s) and the respective other supply container 18 for storing (an) organic binder(s). Furthermore, a spreading device 16 arranged in a fixed-installation manner over the lower belt 3 may be provided.

During operation of the plant, the mixed raw materials may be supplied from the at least two mixing devices 15 arranged in a fixed-installation manner of the at least one spreading device 16 arranged in a fixed-installation manner above the lower belt 3, or arranged in a fixed-installation manner above the conveying means 8 mounted upstream of the lower belt 3, see FIG. 1, via the at least one physical means 17 for transferring mixed raw materials, in particular a conveyor belt 29, a material chute 30 or a material hose.

To transfer the mixed raw materials from the mixing devices 15, two means 17 for transfer are provided in accordance with the depicted exemplary embodiment. As depicted, the mixed raw materials may be transferred initially to a material chute 30 via a conveyor belt 29 and thereafter into the spreading device 16 via the material chute 30 during operation of the plant 1.

Of course, also other configurations with mixing devices 15 and spreading devices 16 arranged in a fixed-installation manner, as well as means 17 for transferring mixed raw materials, are conceivable than those depicted in FIG. 3. For instance, a configuration is possible in which one mixing device 15 is respectively arranged at both sides of the lower belt 3, and that the mixed raw materials are respectively transferred alternately from the mixing devices 15 into the spreading device 16 via a physical means 17. Furthermore, a plant 1 having more than one mixing device 15 arranged in a fixed-installation manner above the lower belt 3, or a conveying means 8 mounted upstream of the lower belt 3 in a transport direction 6, as well as having more than two mixing devices 15 arranged in a fixed-installation manner, is of course also conceivable.

As is further apparent on the basis of FIG. 3, for an even and homogeneous spreading out of the mixed raw materials on the lower belt 3, or a conveying means 8 mounted upstream of the lower belt 3, the spreading device 16, or, if applicable, the spreading devices 16, may have a homogenization device 31, in particular in the form of rolls 32 mounted along a substantially horizontal axis of rotation and rotatable in opposite directions. To convey the mixed raw materials in a spreading device 16, the rolls 32 rotatable in opposite directions may additionally and respectively have a screw profile each, as this is equally apparent from FIG. 3. In addition to the even spreading out of the mixed raw materials on the lower belt 3, or a conveying means mounted upstream, a homogenization device 31 designed in such a way can also for instance serve a better homogenization of the mixed raw materials, for instance by crushing agglutinations. During operation of the plant 1 and while being applied to the lower belt 3 of the dual-belt press 2, or to the conveying means 8 mounted upstream of the lower belt 3, the mixed raw materials in the spreading device(s) 16 may be spread out evenly and homogeneously onto the lower belt 3, or the conveying means mounted upstream 8 of the lower belt 3, by means of such a homogenization device 31. Alternatively or additionally, such homogenization and/or crusher devices 31 may also be arranged so as to be installed upstream of a spreading device 16.

In FIG. 4, a sectional view of a possible design of a spreading device 16 is depicted. A spreading device 16 can in particular be designed funnel-shaped. As illustrated on the basis of the double arrow in FIG. 4, the rolls 32 of the homogenization device 31 may be mounted so as to be readjustable relative to each other, so that a gap between the rolls 32 can be increased or decreased. This constitutes a means for metered spreading, and/or application, of the mixed raw materials (on)to the lower belt 3 or conveying means 8. Furthermore, a spreading device 16 may have readjustable regulating flaps 33, which are in particular sized and arranged in such a way that, in a closed position 34 of the regulating flaps 33, a spreading device 16 can be closed across its entire inner circumference. In the closed position 34 of the regulating flaps 33, mixed raw material(s) cannot come onto the lower belt 3, or conveying means 8, and a starting time of an application and/or spreading operation during operation of the plant 1 can thus be controlled in a targeted manner. Furthermore, this enables a material buffer of mixed raw materials to be formed at the input side of a spreading device 16. Finally, as apparent on the basis of FIG. 4, further regulating flaps 36 may be provided at an output point 35 of a spreading device 16. It is ensured by means of such further regulating flaps 36 that, on the one hand, the quantity of mixed raw materials applied, and/or spread, (on)to the lower belt 3, or the conveying means 8 mounted upstream, per unit of time can be influenced, and/or controlled. Further, this ensures that a material buffer comprising already loosened, and/or dispersed, mixed raw materials can be provisioned also in an output zone of the spreading device 16.

Coming back to FIG. 3, side stops 37 may be arranged at both sides of the lower belt 3 of the dual-belt press 2 to impede a dropping of mixed raw materials from the lower belt 3. Such side stops 37 may be formed for example by permanently installed shoulders connected with the lower belt 3 and moved along with same, or installed in a fixed-installation manner and not connected with the lower belt 3, for instance arranged so as to be floating. In particular in the region of precompaction rolls 11, or pairs of precompaction rolls 12, such side stops 37 can prevent an evasion of the mixed raw materials beyond the lower belt 3, so that the mixed raw materials in such pressing regions can be compacted predominantly by expressing, and/or escaping of, air.

During operation of the plant 1 depicted in FIG. 3, the raw materials in the mixing devices 15 are mixed, again, in accordance with a first timing, and transferred into the spreading device 16 in accordance with a second timing. As depicted in FIG. 3, a control device 38 may be used to control these timings, and also to control further operations, and/or plant components. As indicated, a control device 38 may, to that end, be connected, in terms of signal technology, with different components of the plant 1, and/or drives for the components.

It may in particular be provided that such a control device 38 is configured for carrying out, in accordance with a first timing and at staggered times, mixing operations in the mixing devices 15, as well as for carrying out, in accordance with a second timing and at staggered times, transfer operations of the mixed raw materials from the mixing devices 15 into the spreading device(s) 16. As illustrated, the control device 38 may, to that end, be connected, in terms of signal engineering, with drives for opening and closing components of the mixing devices 15 and spreading device(s) 16, as well as with mixing units of the mixing devices 15.

Yet, as is apparent from FIG. 3, the control device 38 may also be configured to control further components and operations, and/or be connected, in terms of signal engineering, with further plant components for the purpose of their control. In particular, the control device 38 may be configured at least for controlling, in a time-coordinated manner, a metering operation of the raw materials into the mixing devices 15, mixing duration in the mixing devices 15, as well as for controlling an application velocity of the mixed raw materials, and/or the quantity of raw materials applied to the lower belt 3, or the conveying means 8 mounted upstream of the lower belt, per unit of time, belt velocity of the lower belt 8 and compacting pressure on the mixed raw materials with regard to respectively desired density and thickness of the engineered stone slabs. Furthermore, the control device 38 may be configured for adjusting a temperature of the mixed raw materials during operation of the plant 1, for example by adequate control of the heating means 9 depicted in FIG. 1.

In FIG. 5, another and, if applicable, independent variant design of a plant 1 for the continuous production of engineered stone slabs is depicted. In FIG. 5, equal parts are provided with equal reference numbers and/or equal component designations as in the preceding FIGS. 1-4. In order to avoid unnecessary repetition, mention and/or reference is made of and/or to the detailed description in the preceding FIGS. 1-4.

In accordance with the exemplary embodiment depicted in FIG. 5, it may be provided that at least two readjustable mixing devices 15 and at least one spreading device 16 arranged in a fixed-installation manner above the lower belt 3, or above the conveying means 8 mounted upstream of the lower belt 3, are provided, wherein a respective mixing device 15 is arranged so as to be readjustable to an outlet position above the at least one spreading device 16. In the exemplary embodiment depicted in FIG. 5, three readjustable mixing devices 15 are arranged overall, wherein the method can, as is self-explanatory, also be carried out with two, or more than 3, mixing devices by adequately adjusting the first and second timing, respectively, for the mixing operations and the transfer operations, respectively, of mixed raw materials into the spreading device 16.

As is depicted in FIG. 5, the three mixing devices 15 may be arranged carousel-like, so that each mixing device can be readjusted, for instance above the spreading device 16, in an alternating manner, and/or in a time-staggered sequence, from a filling position 39 at one, or multiple, supply container(s) 18, a mixing position 40 and a transfer position 41 for transferring mixed raw materials into the spreading device 16. In an alternative variant design of the plant 1 having two mixing devices 15, it could for example be provided that one mixing device 15 remains in the filling position 39 during a mixing operation. The mixing operations and transfer operations may, once again, respectively be carried out in accordance with adequate predefinable first and predefinable second timings, respectively.

During operation of the exemplary embodiment of the plant 1 in accordance with FIG. 5, the raw materials may thereafter be mixed by means of at least two readjustable mixing devices 15, wherein a respective readjustable mixing device 15 for transferring the mixed raw materials into the at least one spreading device 16 arranged in a fixed-installation manner above the lower belt 3, or above the conveying means 8 mounted upstream of the lower belt 3, can be readjusted respectively to a transfer position 41 above the at least one spreading device 16. When merely one spreading device 16 is used, of course it is not possible for 2 mixing devices 15 to simultaneously take one transfer position 41 above the spreading device 16 and transfer mixed raw materials into the spreading device 16. However, if the spreading device 16 is adequately designed, for instance in accordance with FIG. 4, the spreading device 16 itself can act as a material buffer, so that a continuous and uninterrupted sprinkling of the lower belt 3, or conveying means 8, is nevertheless enabled, in particular if the spreading device 16 is filled to an adequate level with mixed raw materials. Alternatively, of course also multiple over the lower belt 3, or a conveying means 8 mounted upstream of the lower belt 3, in a fixed-installation manner may be used in this variant design. In this case, these spreading devices 16 may be used in a manner at least occasionally overlapping, for example to sprinkle the lower belt 3, or conveying means 8, with mixed raw materials.

As can further be seen in FIG. 5, in this exemplary embodiment a control device 38 may also be connected, in terms of signal engineering, with a readjustment drive for the mixing devices 15 and control the readjustment of the mixing devices 15 to the respective positions (39, 40, 41).

In FIG. 6, another and, if applicable, independent variant design of a plant 1 for the continuous production of engineered stone slabs is depicted. In FIG. 6, equal parts are, again, provided with equal reference numbers and/or equal component designations as in the preceding FIGS. 1-5. In order to avoid unnecessary repetition, mention and/or reference is made of and/or to the detailed description in the preceding FIGS. 1-5.

As is illustrated on the basis of FIG. 6, it may be provided in one design of the plant 1 for the continuous production of engineered stone slabs that at least two displaceable spreading devices 16 are arranged, which displaceable spreading devices 16 are displaceable to a respective loading position 42 to transfer mixed raw materials from a mixing device 15, and which displaceable spreading devices 16 are displaceable to a respective spreading position 43 above the lower belt 3, or the conveying means 8 mounted upstream of the lower belt 3, to apply the mixed raw materials.

A loading position 42 may principally be for example at the end of a transport line for mixed raw materials leading away from a mixing device 15. Yet it may preferably be provided that the displaceable spreading devices 16 are arranged so as to be displaceable to a respective loading position 42 below a mixing device 15, as this is depicted on the basis of the exemplary embodiment in accordance with FIG. 6. In this case, a physical means 17, as for example in the exemplary embodiment depicted in FIG. 3, is not required, but the means for transferring the mixed raw materials from a mixing device 15 into a spreading device 16 is formed by gravity, and/or gravitational force.

As apparent from FIG. 6, the spreading devices 16 may be mounted so as to be displaceable, for example horizontally and perpendicular to the transport direction 6, on guide elements 44, for instance guide rails, and may be displaceable for instance in a motor-actuated, pneumatic or hydraulic manner. As is indicated on the basis of FIG. 6, a control device 38 may, again, be provided, which control device 38 is configured for carrying out, in accordance with a fourth timing and at staggered times, the displacement movements of the displaceable spreading devices 16 to load the spreading devices 16 with mixed raw materials and to apply the mixed raw materials to the lower belt 3, or to the conveying means 8 mounted upstream of the lower belt 3. The control device 38 may to that end be connected, in terms of signal technology, with adequate actuators and sensors for the spreading devices 16.

In the exemplary embodiment depicted in FIG. 6, respectively two mixing devices 15 are allocated to each displaceable spreading device 16, which mixing devices 15 are respectively arranged at both sides of the lower belt 3, or conveying means 8 mounted upstream. A respective spreading device 16 can in this exemplary embodiment switch back and forth between the two allocated mixing devices 15 for loading with mixed raw materials. It is self-evident that, depending on the mixing capacity and in particular the required mixing duration, in an alternative embodiment of the plant 1, in principle also only one mixing device 15 may be allocated to each spreading device 16. Merely in principle, of course also plants 1 having more than two displaceable spreading devices 16 and more than two fixed-installation mixing devices 15 are conceivable, wherein at least one mixing device 15 must be allocated to each spreading device 16.

During operation of the plant 1, the mixed raw materials may thereafter be applied to the lower belt 3, or the conveying means 8 mounted upstream of the lower belt 3, by means of the at least two displaceable spreading devices 16, wherein the spreading devices 16 are displaced, in accordance with a fourth timing and at staggered times, to a respective loading position 42 to transfer the mixed raw materials from a mixing device 15 into a respective spreading device 16, and that the spreading devices 16 are displaced, in accordance with the fourth timing and at staggered times, the spreading devices 16 to a respective spreading position 43 above the lower belt 3, or the conveying means 8 mounted upstream of the lower belt 3, to apply the mixed raw materials. In particular, it may be provided, as depicted in FIG. 6, that the at least two displaceable spreading devices 16 are displaced to a respective loading position 42 below a mixing device 15, and an outlet opening 28, see FIGS. 2a and 2b, of the respective mixing device 15 is subsequently opened, to transfer the mixed raw materials from a mixing device 15 into the spreading devices 16.

When displaceable spreading devices 16 are used, of course at least two adequate spreading devices 16 must be used in order to prevent material gaps on the lower belt 3. As two different spreading devices 16 cannot simultaneously take the same place over the lower belt 3, or the conveying means 8 mounted upstream, it may be provided in accordance with the fourth timing that two spreading devices 16 simultaneously take one spreading position 43 over the lower belt 3, or the conveying means 8 mounted upstream, see FIG. 1, at least some of the time.

In FIGS. 7a, 7b, 7c and 7d, multiple time-staggered snapshots during operation of the plant are schematically depicted in a highly simplified manner to illustrate a possible fourth timing in a plant having two displaceable spreading devices 16. In the depictions, a spreading device 16 depicted in solid lines respectively indicates a spreading device 16 located at a spreading position 43 and being in the process of spreading onto the lower belt 3, or the conveying means 8 mounted upstream, whereas a spreading device depicted in dashed lines is not located in a respective spreading position over the lower belt 3, or the conveying means 8 mounted upstream, and has been displaced for example to a loading position or stopping position.

FIG. 7a shows a spreading device 16 designated with I, by means of which mixed raw materials are in the process of being applied to a lower belt 3, or to a conveying means 8 mounted upstream of a lower belt 3 in a transport direction 6. In the snapshot depicted in FIG. 7b, the sprinkling of the lower belt 3, or of the conveying means 8 mounted upstream, by means of the spreading device 16 designated with I has been terminated, and this spreading device 16 has been displaced for example to a loading position. In FIG. 7b, another spreading device 16 designated with II has been displaced to a spreading position 43 above the lower belt 3 in accordance with the fourth timing. As apparent from FIG. 7b, the spreading position 43 of the spreading device 16 designated with II may be staggered in a transport direction 6 relative to the spreading position 43 of the spreading device 16 designated with I. As is equally apparent from FIG. 7b, a spreading and/or application operation may be begun in a time-phased manner by means of the spreading device 16 designated with II whenever a layer end 45 of a raw-materials layer 44 applied to the lower belt 3, or the conveying means 8 mounted upstream, by means of the spreading device 16 designated with I and conveyed in a transport direction 6, is in the process of passing the spreading position 43 of the spreading device 16 designated with II on the lower belt 3, or the conveying means 8.

In FIG. 7c, a snapshot of the method is depicted, in which both the spreading device 16 designated with I and the spreading device 16 designated with II are respectively located at a spreading position 43 above the lower belt 3, or of the conveying means 8 mounted upstream. In the snapshot in accordance with FIG. 7c, mixed raw materials are beginning to be applied to the lower belt 3, or the conveying means 8 mounted upstream, by means of the spreading device 16 designated with I, while mixed raw materials continue to be applied to the lower belt 3, or the conveying means 8 mounted upstream, by means of the spreading device 16 designated with II. Once a layer front 46 of the raw-material layer applied to the lower belt 3, or the conveying means 8 mounted upstream in a transport direction 6, by means of the spreading device 16 designated with I has reached the spreading position 43 of the spreading device 16 designated with II, the application of the mixed raw materials by means of the spreading device 16 designated with II can be terminated, and the spreading device 16 designated with II can be displaced for example to a loading or stopping position, as this is depicted in accordance with the snapshot in FIG. 7d. Subsequently, the loop can be perpetually repeated in accordance with the chronology depicted on the basis of the snapshots in FIGS. 7a, 7b, 7c and 7d.

As described above, depending on the mixing capacity of the respective mixing devices and on a respectively required or desired mixing duration of individual mixing operations, also for example more than two mixing devices 15 and spreading devices 16 may be used. In FIGS. 8a, 8b, 8c, 8d and 8e, another exemplary embodiment for a possible method flow in accordance with a fourth timing using three displaceable spreading devices 16 is illustrated on the basis of snapshots respectively depicted during operation of the plant 1. Like in FIGS. 7a, 7b, 7c and 7d, a spreading device 16 depicted in solid lines respectively indicates, also in FIGS. 8a, 8b, 8c, 8d and 8e, a spreading device 16 located at a spreading position 43 and being in the process of applying mixed raw materials to the lower belt 3, or the conveying means 8 mounted upstream, whereas a spreading device depicted in dashed lines is not located in a respective spreading position over the lower belt 3, or the conveying means 8 mounted upstream, and has been displaced for example to a loading position or stopping position.

Figure 8A:
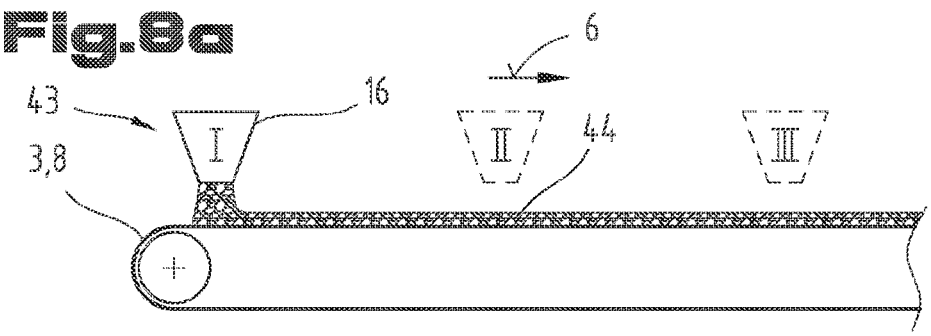
Figure 8B:
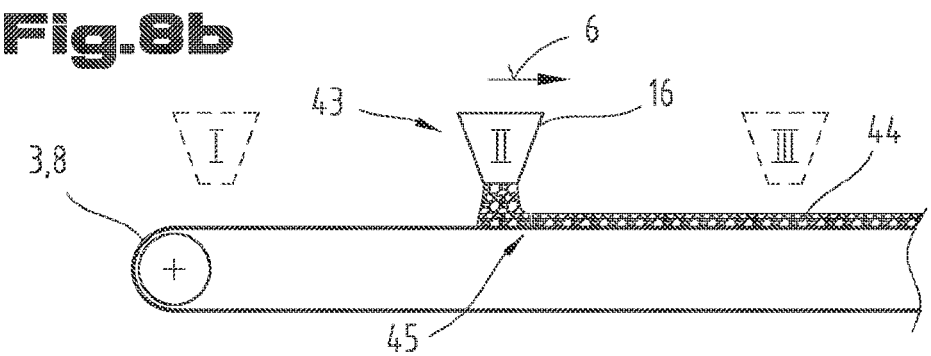

The snapshot in accordance with FIG. 8a shows a spreading device 16 designated with I above a lower belt 3, or conveying means 8 mounted upstream, which spreading device 16 is in the process of applying mixed raw materials to the lower belt, or conveying means mounted upstream. In the succeeding snapshot in accordance with FIG. 8b, another spreading device 16 designated with II has been displaced to a spreading position 43 which is staggered in a transport direction 6, and this spreading device 16 designated with II is in the process of applying mixed raw materials to the lower belt 3, or the conveying means 8 mounted upstream. The application may, again, be started when a layer end 46 of the raw-material layer 44 applied to the lower belt 3, or conveying means 8, by means of the spreading device 16 designated with I, passes the spreading position of the spreading device 16 designated with II on the lower belt 3, or the conveying means 8.

Figure 8C:
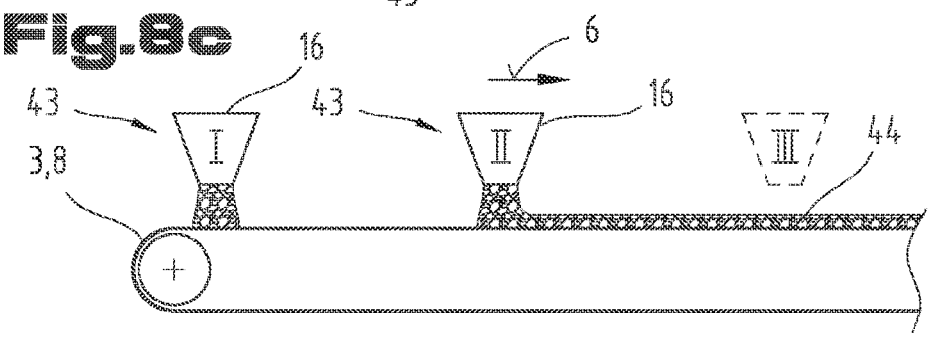

The following snapshot in accordance with FIG. 8c continues to show the spreading device 16 designated with II, which is still applying mixed raw materials to the lower belt 3, or the conveying means 8 mounted upstream. Furthermore, in accordance with this exemplary embodiment, also the spreading device 16 designated with I has, once again, been displaced to spreading position 43, and mixed raw materials are also applied by means of the spreading device 16 designated with I. Again, this is done using the spreading device 16 designated with II, with the same chronology as in the variant embodiment in accordance with FIG. 7c, in such a way that material gaps or material excesses do not occur on the lower belt 3, or conveying means 8.

Figure 8D:
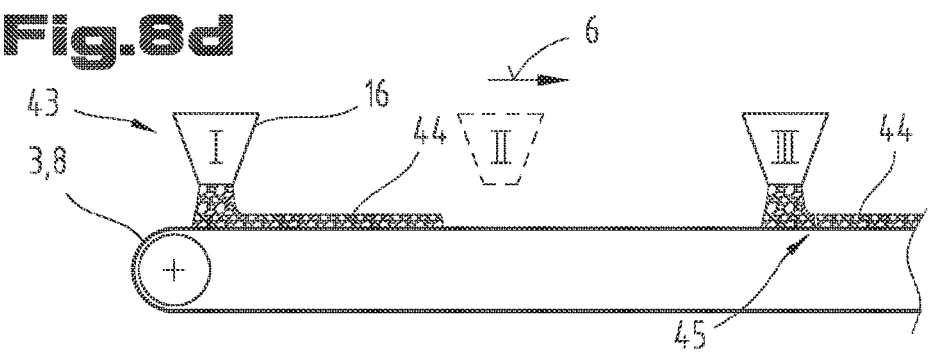

In FIG. 8d, a following snapshot is depicted, in which the spreading device 16 designated with I continues to apply mixed raw materials to the lower belt 3, or the conveying means 8 mounted upstream. The spreading device designated with II has been displaced away from the lower belt 3, or from the conveying means 8. Another spreading device 16, designated with III, has been displaced to another, and/or third, spreading position 43, and the application of mixed raw materials by means of this spreading device 16 has just been started. The application of the mixed raw materials by means of the spreading device designated with III, as illustrated, may be started in a time-coordinated manner whenever a layer end 45 of the raw-material layer 44 applied to the lower belt 3, or the conveying means 8, by means of the spreading device 16 designated with II passes the spreading position 43 of the spreading device 16 designated with III.

Figure 8E:
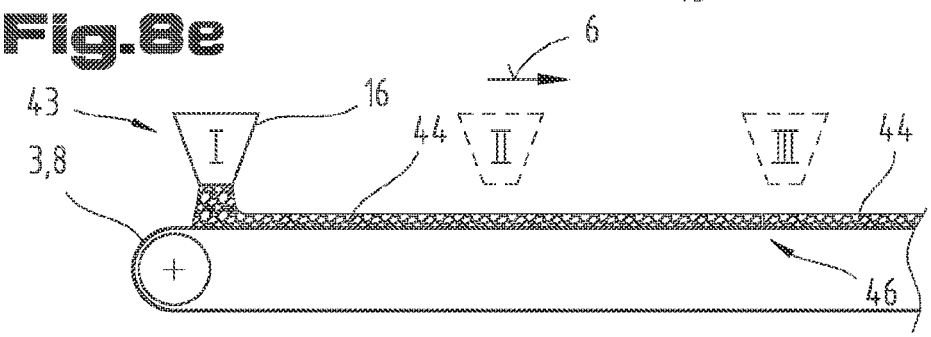

As is finally illustrated on the basis of the snapshot in accordance with FIG. 8e, the spreading device 16 designated with III may be displaced away from its spreading position 43 whenever a layer front 46 of the raw-material layer 44 applied to the lower belt 3, or the conveying means 8 mounted upstream, by means of the spreading device 16 designated with I has reached the spreading position 43 of the spreading device 16 designated with III. In the exemplary embodiment shown in FIGS. 8a-8e for a possible execution of the method, the spreading device 16 designated with III fills the material gap between the spreading devices 16 designated with II and designated with I.

As an alternative to the method sequence depicted in FIGS. 8a-8e, also other flow sequences could self-evidently be put to use re the method of three, or more, spreading devices 16. For instance, it could be provided that, instead of the snapshot depicted in FIG. 8c, the device designated with III, following the spreading device 16 designated with II, applies the mixed raw materials to the lower belt 3, or conveying means 8, and only afterwards, once again, by means of the spreading device 16 designated with I.

In FIG. 9, another variant embodiment of the method is finally schematically illustrated. As apparent from FIG. 9, it may be provided that the mixed raw materials are applied to the lower belt 3, or to the conveying means 8 mounted upstream of the lower belt 3, by means of at least two spreading devices 16 in at least two raw-material layers 47, 48 arranged on top of one another. This is true independent of whether mixing devices 15 and spreading devices 16 arranged in a fixed-installation manner or readjustable, and/or displaceable, mixing devices 15 and spreading devices 16 are used.

In the depicted exemplary embodiment, both spreading devices 16 arranged over the lower belt 3 in a fixed-installation manner, and, overall, four mixing devices 15 arranged in a fixed-installation manner are shown, wherein respectively two mixing devices 15 are allocated to a spreading device 16 in terms of functional technology. The handover, and/or transfer, of mixed raw materials from a respective mixing device 15 into a respective spreading device 16 is accomplished in the exemplary embodiment depicted in FIG. 9 using physical means 17 for transferring the mixed raw materials, which physical means 7 are configured as conveyor belts 29.

As depicted in FIG. 9, a first raw-material layer 47 can be directly applied to the lower belt 3 by means of the spreading device 16 depicted on the left hand side, and, following this first raw-material layer 47 in a transport direction 6, a second raw-material layer 48 a second raw-material layer 48 can be applied to the first raw-material layer 47 by means of the spreading device 16 depicted on the right hand side in FIG. 9. Such an execution of the method, and/or plant 1, enables especially higher belt speed of the lower belt 3 and upper belt of a dual-belt press, and thus also higher production rates for engineered stone slabs. The mixing operations in the mixing devices 15 and the transfer operations of mixed raw materials into the spreading devices 16, respectively, are of course respectively carried out in accordance with a first and second timing, respectively, also in case of an execution of the method by applying multiple raw-material layers 47, 48.

Self-evidently, such an execution of the method is also possible by means of readjustable mixing devices 15 or displaceable spreading devices 16. Further, an application of more than two raw-material layers 47, 48 is of course also possible, in principle.

Independent of this, a raw-material layer 44, or raw-material layers 47, 48, is, or are, conveyed on the lower belt 3 in a transport direction 6, if applicable, after a precompaction using precompaction rolls 11, and/or pairs of precompaction rolls 12, between lower belt 3 and upper belt 4 of the dual-belt press 2, as this is most easily apparent on the basis of FIG. 1. The raw-material layers 44, 47, 48 may be compacted in the dual-belt press 2 for example by means of cheek plates or press belts 49, such as rod press belts, to form the ultimate, respectively desired final thickness, and/or density, of the engineered stone slabs. As described above, a precompaction of the mixed raw materials before the entry between lower belt 3 and upper belt 4 may indeed already be very high, so that only a small, or even at least almost no, reduction in layer thickness, and/or compaction, may be done between lower belt 3 and upper belt 4 of the dual-belt press 2. The organic binder may be cured in the dual-belt press 2 by heating the mixed raw materials, for example by means of the heating means 9 depicted in FIG. 1. Finally, if applicable, after passing through a cooling zone 22, a resulting engineered stone-material strand 24 may be separated into the individual engineered stone slabs by means of a cutting device 23, depending on the desired sizes.

The exemplary embodiments show possible embodiment variants, and it should be noted in this respect that the invention is not restricted to these particular depicted embodiment variants of it, but that rather various combinations of the individual embodiment variants with each other are possible and this possibility of variants based on the technical teaching by means of the invention at issue lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the present description are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at an upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

LIST OF REFERENCE NUMBERS

1 plant
2 dual-belt press
3 lower belt
4 upper belt
5 material application zone
6 transport direction
7 processing zone
8 conveying means
9 heating means
10 entry point
11 precompaction roll
12 pair of precompaction rolls
13 compaction roll
14 back-pressure roll
15 mixing device
16 spreading device
17 means
18 supply container
19 metering device
20 plow
21 doctor blade
22 cooling zone
23 cutting device
24 material strand
25 switchover flap
26 casing
27 inlet opening
28 outlet opening
29 conveyor belt
30 material chute
31 homogenization device
32 roll
33 regulating flap
34 closed position
35 output point
36 regulating flap
37 side stop
38 control device
39 filling position
40 mixing position
41 transfer position
42 loading position
43 spreading position
44 raw-materials layer
45 layer end
46 layer front
47 raw-materials layer
48 raw-materials layer
49 press belt

The invention claimed is:

1. A method for the continuous production of engineered stone slabs, comprising the steps
   providing raw materials comprising at least one mineral filler and at least one organic binder,
   mixing the raw materials,
   applying the mixed raw materials to a continuously moving lower belt of a dual-belt press, or a continuously moving conveying means (8) mounted upstream of the lower belt,
   continuously pressing the mixed raw materials to form a pressed material strand,
   curing the organic binder, and
   separating the material strand to form individual engineered stone slabs,
      wherein the mixing of the raw materials is carried out in accordance with a first timing at staggered times in a batch mixing operation by means of at least two separate mixing devices,
      wherein the at least two mixing devices are supplied with a defined quantity of the raw materials before a respective batch mixing operation begins,
      wherein the mixed raw materials are transferred, in accordance with a second timing and at staggered times, from the at least two mixing devices into one, or multiple, spreading device(s), and the mixed raw materials are applied continuously and without interruption to the lower belt, or the conveying means mounted upstream of the lower belt, by means of the spreading device(s),
      wherein a supply container is provided for storing, and/or interim storing, the at least one mineral filler and another supply container is provided for storing the at least one organic binder,
      wherein the at least one mineral filler and the at least one organic binder are supplied to the at least two mixing devices for a respective mixing operation,
      wherein the mixing devices are fed with the raw materials via an inlet opening, and the mixed raw materials are emptied from the mixing devices via an outlet opening, and
      wherein the inlet opening and the outlet opening are closed for the respective mixing operation, so that the mixing operation is respectively carried out in a closed casing of the mixing devices.

2. The method according to claim 1, wherein the mixed raw materials are supplied from at least two mixing devices arranged in a fixed-installation manner of at least one spreading device arranged in a fixed-installation manner above the lower belt, or arranged in a fixed-installation manner above the conveying means mounted upstream of the lower belt, via at least one physical means comprising a conveyor belt, a material chute or a material hose for transferring mixed raw materials.

3. The method according to claim 1, wherein the raw materials are mixed by means of at least two readjustable mixing devices, wherein a respective readjustable mixing device is readjusted respectively to a transfer position above at least one spreading device arranged in a fixed-installation manner above the lower belt, or above the conveying means mounted upstream of the lower belt, to transfer the mixed raw materials into the at least one spreading device.

4. The method according to claim 1, wherein the mixed raw materials are applied to the lower belt, or the conveying means mounted upstream of the lower belt, by means of at least two displaceable spreading devices, wherein the spreading devices are displaced, in accordance with a fourth timing and at staggered times, to a respective loading position to transfer the mixed raw materials from a mixing device into a respective spreading device, and the spreading devices are displaced, in accordance with the fourth timing and at staggered times, to a respective spreading position above the lower belt, or the conveying means mounted upstream of the lower belt to apply the mixed raw materials.

5. The method according to claim 4, wherein the at least two displaceable spreading devices are displaced to a respective loading position below a mixing device, and an outlet opening of the respective mixing device is subsequently opened, to transfer the mixed raw materials from a mixing device into the spreading devices.

6. The method according to claim 1, wherein the mixed raw materials are applied to the lower belt, or to the conveying means mounted upstream of the lower belt, in at least two raw-material layers arranged on top of one another by means of the at least two spreading devices.

7. The method according to claim 1, wherein the mixed raw materials are spread out evenly and homogeneously by means of a homogenization device arranged in the spreading device(s), and are applied to the lower belt, or the conveying means mounted upstream of the lower belt.

8. The method according to claim 1, wherein the raw materials applied to the lower belt are compacted between the upper belt and the lower belt of the dual-belt press by means of one, or multiple, precompaction roll(s), or pair(s) of precompaction rolls, before an entry point between the upper belt and the lower belt.

9. A plant for the continuous production of engineered stone slabs, comprising
one, or multiple, supply container(s) for containing raw materials,
and a dual-belt press having a lower belt and an upper belt, as well as at least one heating means for heating materials conveyed between the lower belt and the upper belt,
wherein at least two separately arranged mixing devices designed for a batch mixing operation, are arranged to mix the raw materials,
wherein one, or multiple, spreading device(s) is, or are, arranged, which is, or are, configured for continuous feeding of the lower belt, or of a conveying means mounted upstream of the lower belt, with mixed raw materials,
wherein at least one means for transferring mixed raw materials from the at least two mixing devices into the spreading device(s) is provided,
wherein at least two displaceable spreading devices are arranged, which displaceable spreading devices are displaceable from a respective mixing device to a respective loading position to transfer mixed raw materials, and which displaceable spreading devices are displaceable to a respective spreading position above the lower belt, or the conveying means mounted upstream of the lower belt, to apply the mixed raw materials, and
wherein a control device is provided, which control device is configured for carrying out, in accordance with a fourth timing and at staggered times, the displacement movements of the displaceable spreading devices to load the spreading devices with mixed raw materials and to apply the mixed raw materials to the lower belt, or to the conveying means mounted upstream of the lower belt.

10. The plant according to claim 9, wherein the control device is configured for carrying out, in accordance with a first timing and at staggered times, mixing operations in the mixing devices, as well as for carrying out, in accordance with a second timing and at staggered times, transfer operations of the mixed raw materials from the mixing devices into the at least two spreading devices.

11. The plant according to claim 9, wherein the mixing devices respectively have a casing with a closable inlet opening and a closable outlet opening.

12. The plant according to claim 9, wherein at least two mixing devices arranged in a fixed-installation manner are provided, wherein at least one spreading device of the at least two spreading devices is arranged in a fixed-installation manner above the lower belt, or arranged in a fixed-installation manner above the conveying means mounted upstream of the lower belt, and wherein at least one physical means comprising a conveyor belt, a material chute or a material hose for transferring mixed raw materials is arranged to transfer mixed raw materials from the mixing devices into the at least one spreading device arranged in a fixed-installation manner.

13. The plant according to claim 9, wherein at least two readjustable mixing devices are provided, wherein at least one spreading device of the at least two spreading devices is arranged in a fixed-installation manner above the lower belt, or above the conveying means mounted upstream of the lower belt, wherein a respective mixing device is arranged so as to be readjustable to an outlet position above the at least one spreading device.

14. The plant according to claim 9, wherein the displaceable spreading devices are arranged so as to be displaceable to a respective loading position below a mixing device.

15. The plant according to claim 9, wherein the at least two spreading devices have a homogenization device for an even and homogeneous spreading out of the mixed raw materials on the lower belt, or the conveying means mounted upstream of the lower belt.

16. The plant according to claim 9, wherein one, or multiple, precompaction roll(s), or pair(s) of precompaction rolls, is, or are, arranged in a transport direction for the raw materials at the lower belt before an entry point between the upper belt and the lower belt of the dual-belt press.

* * * * *